United States Patent
Pflaum et al.

(10) Patent No.: US 12,293,245 B2
(45) Date of Patent: *May 6, 2025

(54) INFORMATION STORAGE METHOD AND INFORMATION STORAGE MEDIUM WITH INCREASED STORAGE DENSITY BY MULTI-BIT CODING

(71) Applicant: Ceramic Data Solutions GmbH, Gmunden (AT)

(72) Inventors: Christian Pflaum, Bernried (DE); Martin Kunze, Gmunden (AT)

(73) Assignee: Ceramic Data Solutions GmbH, Gmunden (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,905

(22) Filed: Dec. 5, 2023

(65) Prior Publication Data
US 2024/0119246 A1    Apr. 11, 2024

Related U.S. Application Data

(63) Continuation of application No. 18/003,962, filed as application No. PCT/EP2021/053894 on Feb. 17, 2021, now Pat. No. 11,875,207, which is a continuation-in-part of application No. PCT/EP2020/072872, filed on Aug. 14, 2020, and a continuation-in-part of application No. PCT/EP2020/068892, filed on Jul. 3, 2020.

(51) Int. Cl.
*G06K 19/06*    (2006.01)

(52) U.S. Cl.
CPC .............................. *G06K 19/06121* (2013.01)

(58) Field of Classification Search
CPC ....... G06K 19/06121; G06K 19/06046; G06K 19/06037
See application file for complete search history.

(56) References Cited

U.S. PATENT DOCUMENTS

| | | | |
|---|---|---|---|
| 4,069,487 | A | 1/1978 | Kasai et al. |
| 4,214,249 | A | 7/1980 | Kasai et al. |
| 4,556,893 | A | 12/1985 | Rinehart et al. |
| 4,797,316 | A | 1/1989 | Hecq et al. |
| 5,063,556 | A | 11/1991 | Chikuma |
| 5,761,111 | A | 6/1998 | Glezer |
| 6,039,898 | A | 3/2000 | Glushko |

(Continued)

FOREIGN PATENT DOCUMENTS

| | | |
|---|---|---|
| CN | 110653494 | 1/2020 |
| DE | 19724214 | 12/1998 |

(Continued)

OTHER PUBLICATIONS

Gustafsson, Mats G.L., "Nonlinear Structured-Illumination Microscopy: Wide-Field Fluorescence Imaging with Theoretically Unlimited Resolution," PNAS, vol. 102, No. 37, Sep. 13, 2005, pp. 13081-13086.

(Continued)

*Primary Examiner* — Seung H Lee
(74) *Attorney, Agent, or Firm* — Lewis & Reese, PLLC

(57) ABSTRACT

The invention relates to a method for storage of information and to an information storage medium with increased storage density by multi-bit coding.

15 Claims, 10 Drawing Sheets

(56) References Cited

U.S. PATENT DOCUMENTS

| | | | |
|---|---|---|---|
| 6,120,907 | A | 9/2000 | Tahon et al. |
| 6,133,986 | A | 10/2000 | Johnson |
| 6,143,468 | A | 11/2000 | Ohno et al. |
| 6,171,730 | B1 | 1/2001 | Kuroda et al. |
| 6,214,250 | B1 | 4/2001 | Moh et al. |
| 6,340,543 | B1 | 1/2002 | Nagamura et al. |
| 6,543,691 | B1 | 4/2003 | Lemelson et al. |
| 8,462,605 | B2 | 6/2013 | Ferren et al. |
| 10,180,623 | B2 | 1/2019 | Wakamatsu et al. |
| 10,181,336 | B1 | 1/2019 | Georgiou et al. |
| 10,315,276 | B2 | 6/2019 | Wagner et al. |
| 10,719,239 | B2 | 7/2020 | Rowstron et al. |
| 10,762,407 | B2 | 9/2020 | Gold |
| 11,875,207 | B2 * | 1/2024 | Pflaum ............ G06K 19/06037 |
| 2002/0028015 | A1 | 3/2002 | Tack-Don et al. |
| 2002/0079297 | A1 | 6/2002 | Harrison |
| 2003/0186624 | A1 | 10/2003 | Koike et al. |
| 2003/0189228 | A1 | 10/2003 | Ieong et al. |
| 2005/0181089 | A1 | 8/2005 | Ogawa et al. |
| 2005/0208392 | A1 | 9/2005 | Yamamoto |
| 2006/0044385 | A1 | 3/2006 | Wurm et al. |
| 2006/0119743 | A1 | 6/2006 | Lin |
| 2006/0120262 | A1 | 6/2006 | Kiyono |
| 2006/0147841 | A1 | 7/2006 | Ohmi et al. |
| 2006/0196945 | A1 | 9/2006 | Mendels |
| 2008/0238611 | A1 | 10/2008 | Costa et al. |
| 2008/0320205 | A1 | 12/2008 | Lunt et al. |
| 2009/0207395 | A1 | 8/2009 | Kasono |
| 2009/0245077 | A1 | 10/2009 | Ueda et al. |
| 2009/0267268 | A1 | 10/2009 | Yoneda et al. |
| 2010/0040960 | A1 | 2/2010 | Piao et al. |
| 2010/0135147 | A1 | 6/2010 | Bard et al. |
| 2010/0151391 | A1 | 6/2010 | Neogi et al. |
| 2010/0289186 | A1 | 11/2010 | Longo et al. |
| 2011/0318695 | A1 | 12/2011 | Hwang et al. |
| 2013/0273259 | A1 | 10/2013 | Depardieu et al. |
| 2015/0077535 | A1 | 3/2015 | Izatt et al. |
| 2015/0302883 | A1 | 10/2015 | Watanabe et al. |
| 2015/0302926 | A1 | 10/2015 | Shiozawa et al. |
| 2015/0324677 | A1 | 11/2015 | Talyansky et al. |
| 2015/0382476 | A1 | 12/2015 | Zenou et al. |
| 2016/0118077 | A1 | 4/2016 | Lunt et al. |
| 2016/0199935 | A1 | 7/2016 | Chen et al. |
| 2018/0039806 | A1 | 2/2018 | Harrison |
| 2018/0130531 | A1 | 5/2018 | Ahner et al. |
| 2019/0273025 | A1 | 9/2019 | Chen et al. |
| 2019/0324240 | A1 | 10/2019 | Shroff et al. |
| 2019/0353912 | A1 | 11/2019 | Chen et al. |
| 2020/0075383 | A1 | 3/2020 | Minemura |
| 2020/0142171 | A1 | 5/2020 | Xiong et al. |

FOREIGN PATENT DOCUMENTS

| | | |
|---|---|---|
| DE | 102014118497 | 6/2017 |
| EP | 2157533 | 2/2010 |
| EP | 3109058 | 12/2016 |
| EP | 3031785 | 10/2018 |
| EP | 3955248 | 2/2022 |
| EP | 4044182 | 8/2022 |
| JP | H02-215587 | 8/1990 |
| JP | H02-277689 | 11/1990 |
| JP | 2001071451 A | 3/2001 |
| JP | 2002-351055 | 3/2002 |
| JP | 2003-137677 | 5/2003 |
| JP | 2004-062981 | 2/2004 |
| JP | 3913319 | 5/2007 |
| JP | 2008269219 A | 11/2008 |
| JP | 2009515811 A | 4/2009 |
| JP | 2019133724 A | 8/2019 |
| JP | 6689067 | 4/2020 |
| JP | 2020064697 A | 4/2020 |
| KR | 20010112497 | 12/2001 |
| WO | 91/13440 | 9/1991 |
| WO | 2000/073983 | 12/2000 |
| WO | 2021/028035 | 2/2021 |
| WO | 2022/002418 | 1/2022 |
| WO | 2022/002444 | 1/2022 |
| WO | 2022/033701 | 2/2022 |
| WO | 2022/033800 | 2/2022 |
| WO | 2022/194354 | 9/2022 |

OTHER PUBLICATIONS

Watanabe M., et al., "Three-Dimensional Optical Data Storage in Vitreous Silica," Japanese Journal of Applied Physics, JP, vol. 37, No. 12 B, part 02, Dec. 15, 1998.

Glezer, E. N., et al., "Three-Dimensional Optical Storage Inside Transparent Materials," Optics Letters, vol. 21, No. 24, Dec. 15, 1996, 3 pages.

Glezer E. N., et al., "Ultrafast-Laser Driven Micro-Explosions in Transparent Materials," Appl. Phys., Lett. 71 (7), Aug. 18, 1997, 3 pages.

Benton, David M., "Multiple Beam Steering Using Dynamic Zone Plates on a Micro-Mirror Array," Optical Engineering, 57 (7), 2018, 13 pages.

Qi, Z.B., et al., "A Comprehensive Study of the Oxidation Behavior of Cr2N and CrN Coatings," 544, 2013, pp. 515-520.

Webster's Ninth New Collegiate Dictionary; Merrian-Webster Inc.; Springfield, Mass, USA; 1990 (no month); excerpt p. 224.

"Glass Composition, Glass Types," retrieved Dec. 17, 2020 from website ://glassproperties.com/glasses.

International Search Report and Written Opinion regarding corresponding PCT Application No. PCT/EP2021/053894, mailed May 6, 2021.

Haight, Richard, et al., "High Resolution Material Ablation and Deposition with Femtosecond Lasers and Applications to Photomask Repair," Journal of Modern Optics, Nov. 10-Dec. 15, 2004, vol. 51, No. 16-18, pp. 2781-2796.

Morishige, Yukio, "High Accuracy Laser Mask Repair Technology Using ps UV Solid State Laser," Second International Symposium on Laser Precision Microfabrication, Proceedings of SPIE, vol. 4426, 2002, pp. 416-423.

Venketakrishnan, K., et al., "Laser Writing Techniques for Photomask Fabrication Using a Femtosecond Laser," Applied Physics A Materials Science & Processing, vol. 74, 2002, pp. 493-496.

Notification of Reason(s) for Refusal regarding corresponding Japanese Patent Application No. 2022-581538, mailed Mar. 4, 2025.

* cited by examiner

Fig. 3a
Schematic
16 Code elements = 4 Bits
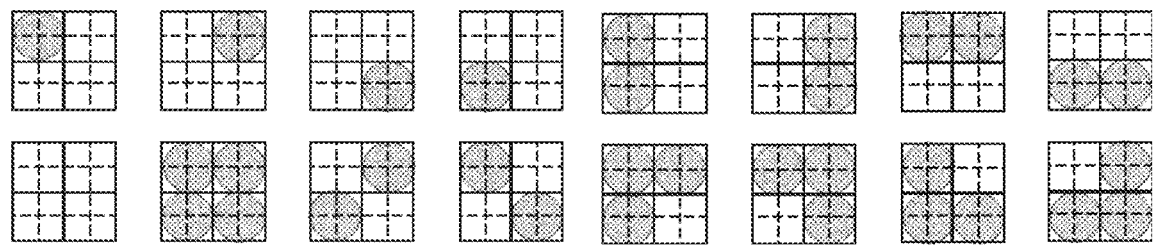
Example
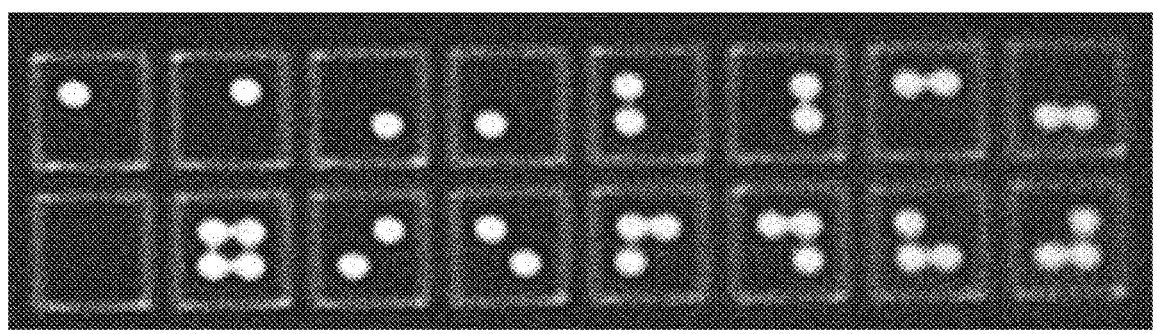

Fig. 3b
Schematic
16 Code elements = 4 Bits
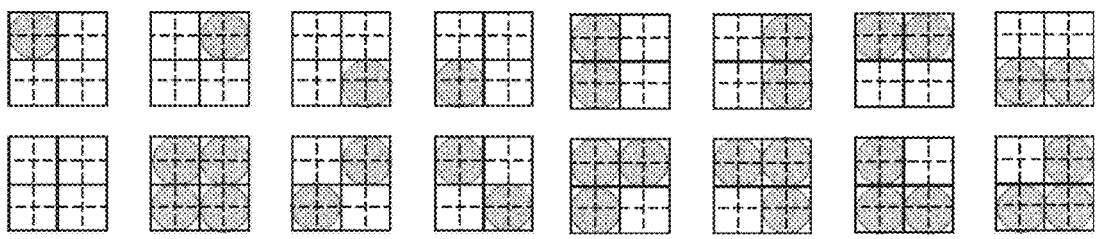
+ 19 Code elements = 4 Bits
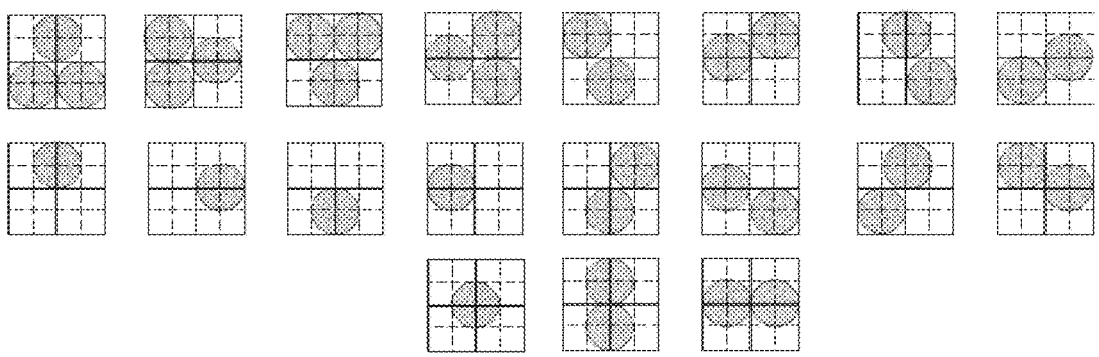
= 35 Code elements = 5,13 Bits
Example
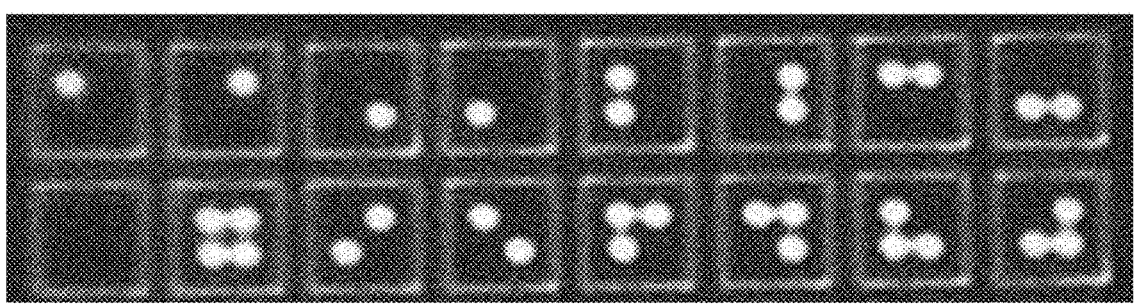
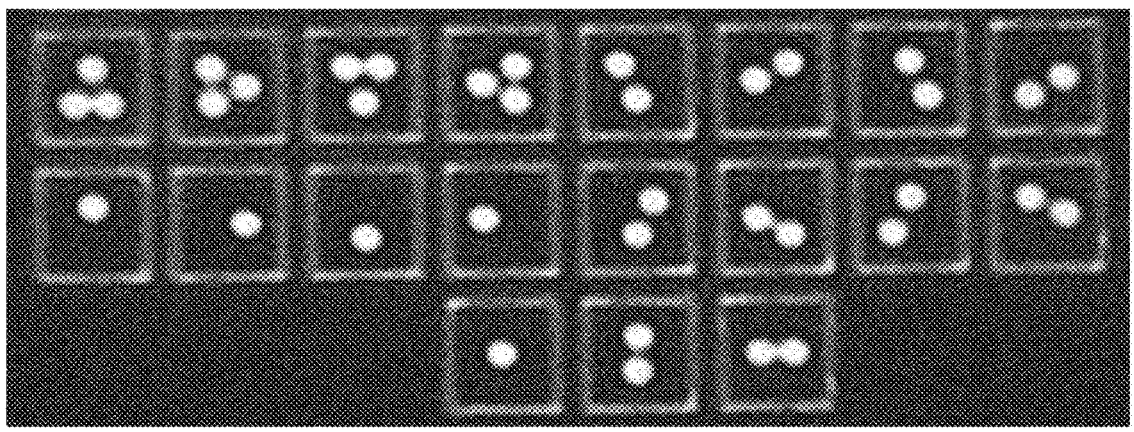

Fig. 4
Schematic
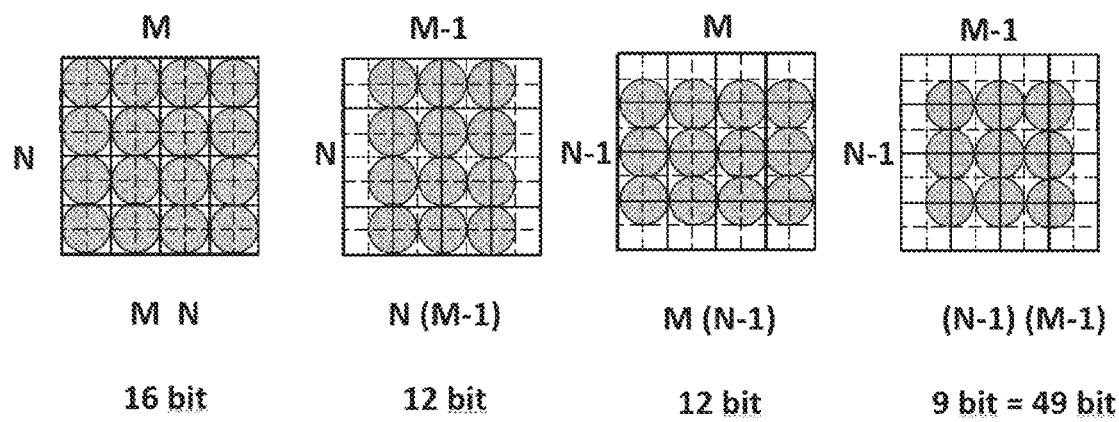
Example
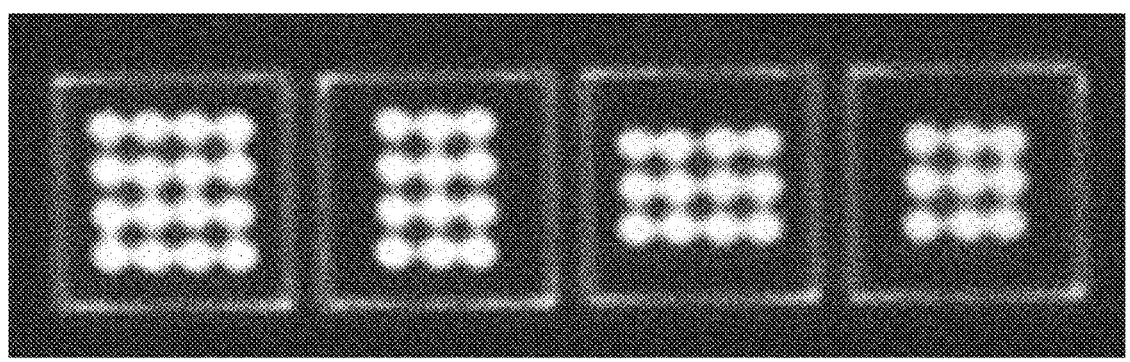

Fig. 5a Schematic
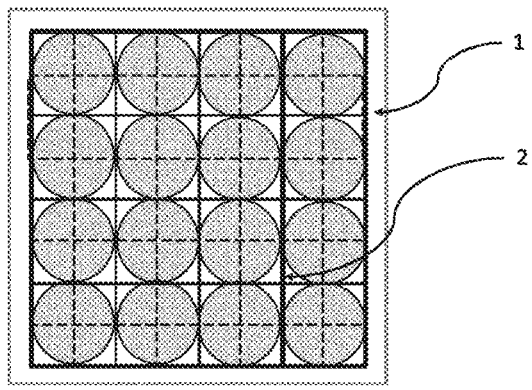
Fig. 5b Schematic
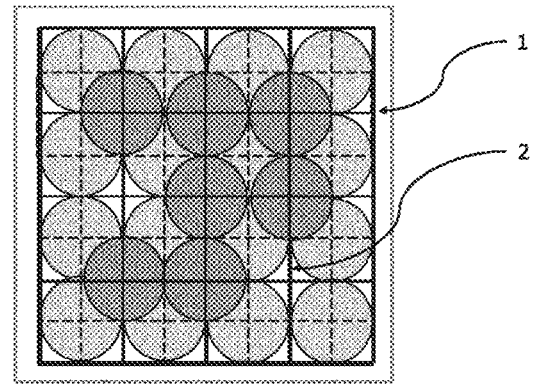
Example
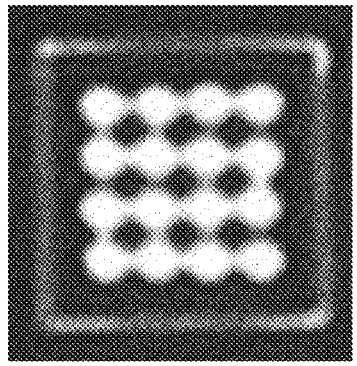
Example
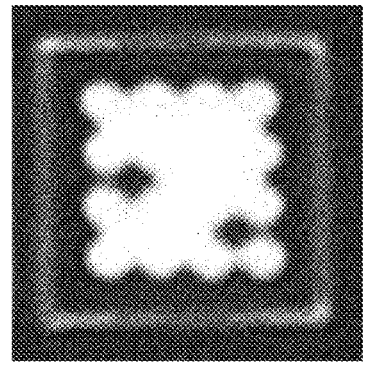

Fig. 6
Schematic
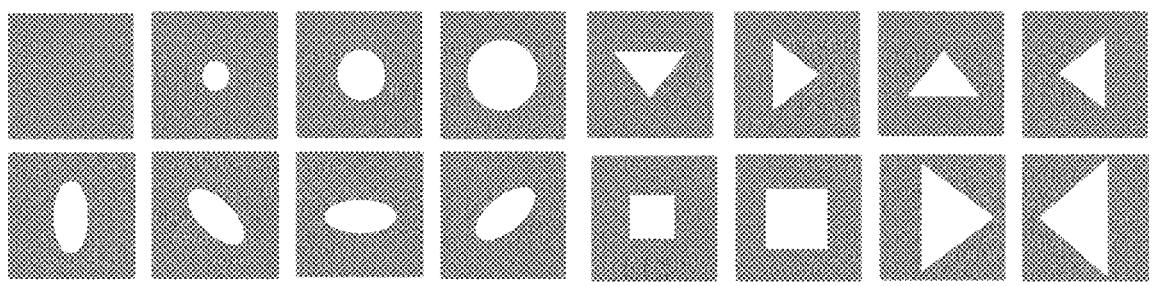
Example
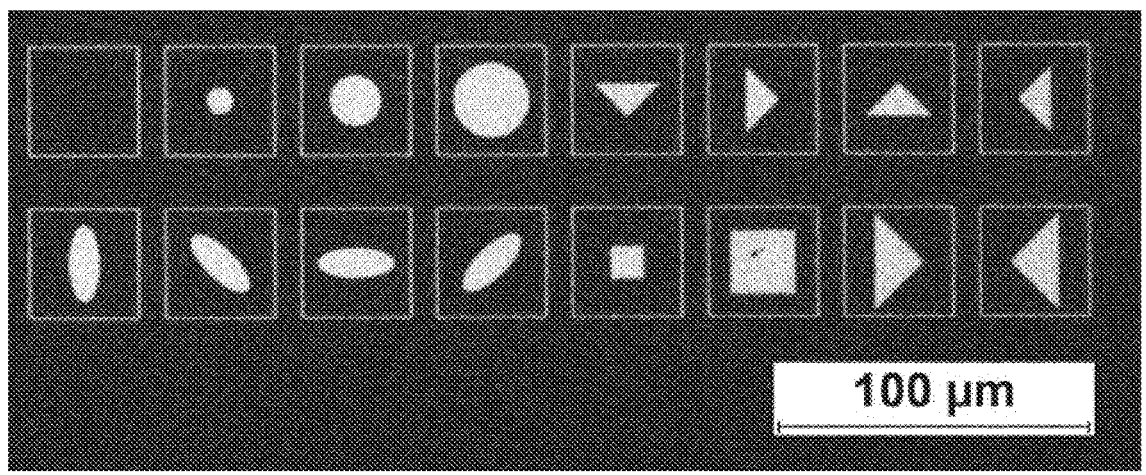

Fig. 7
Schematic
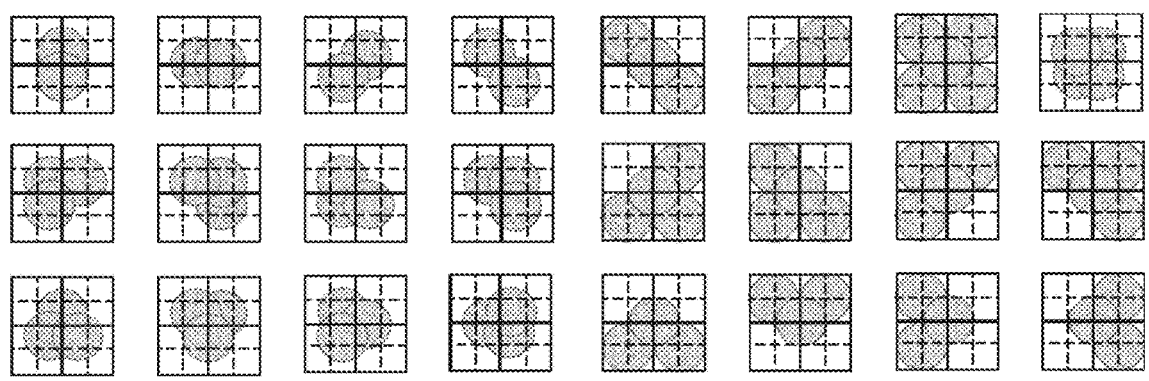
Example
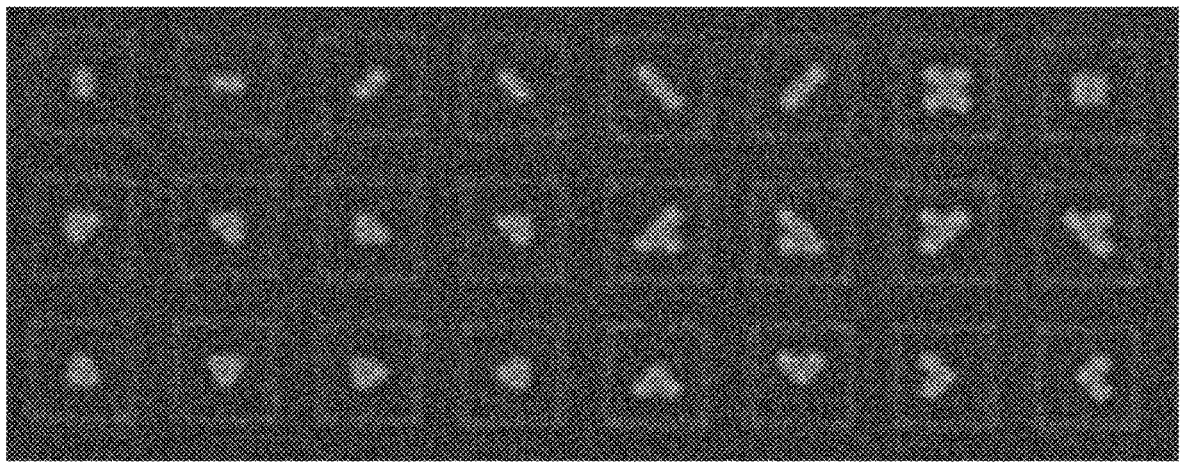

Fig. 10 a  Schematic
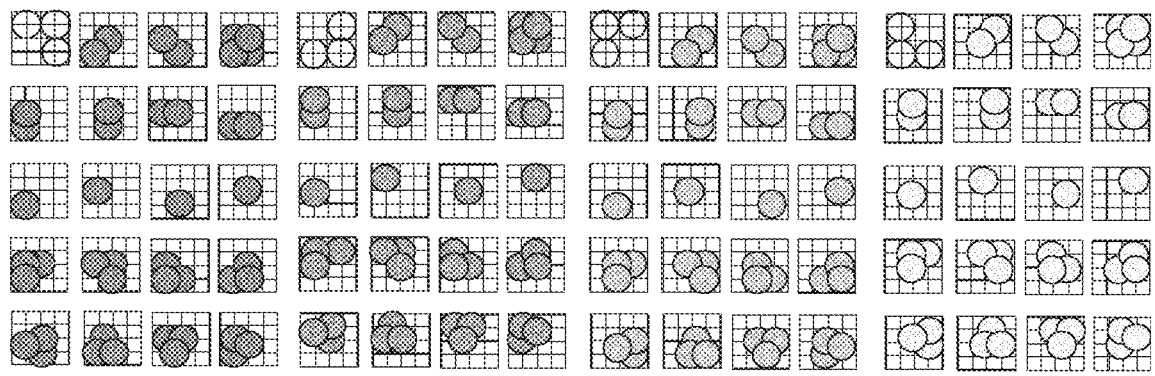
Example
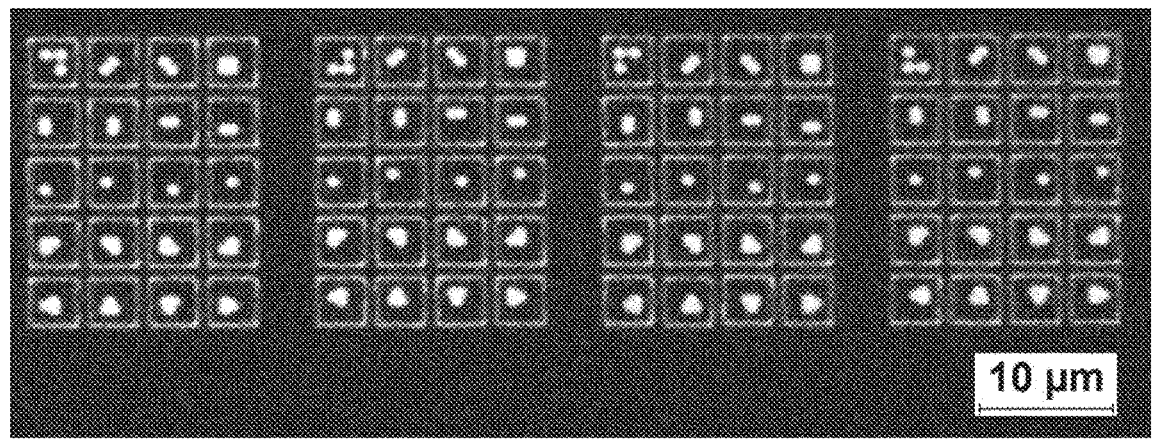
10 μm

Fig. 10 b  Example of Code-Permutations
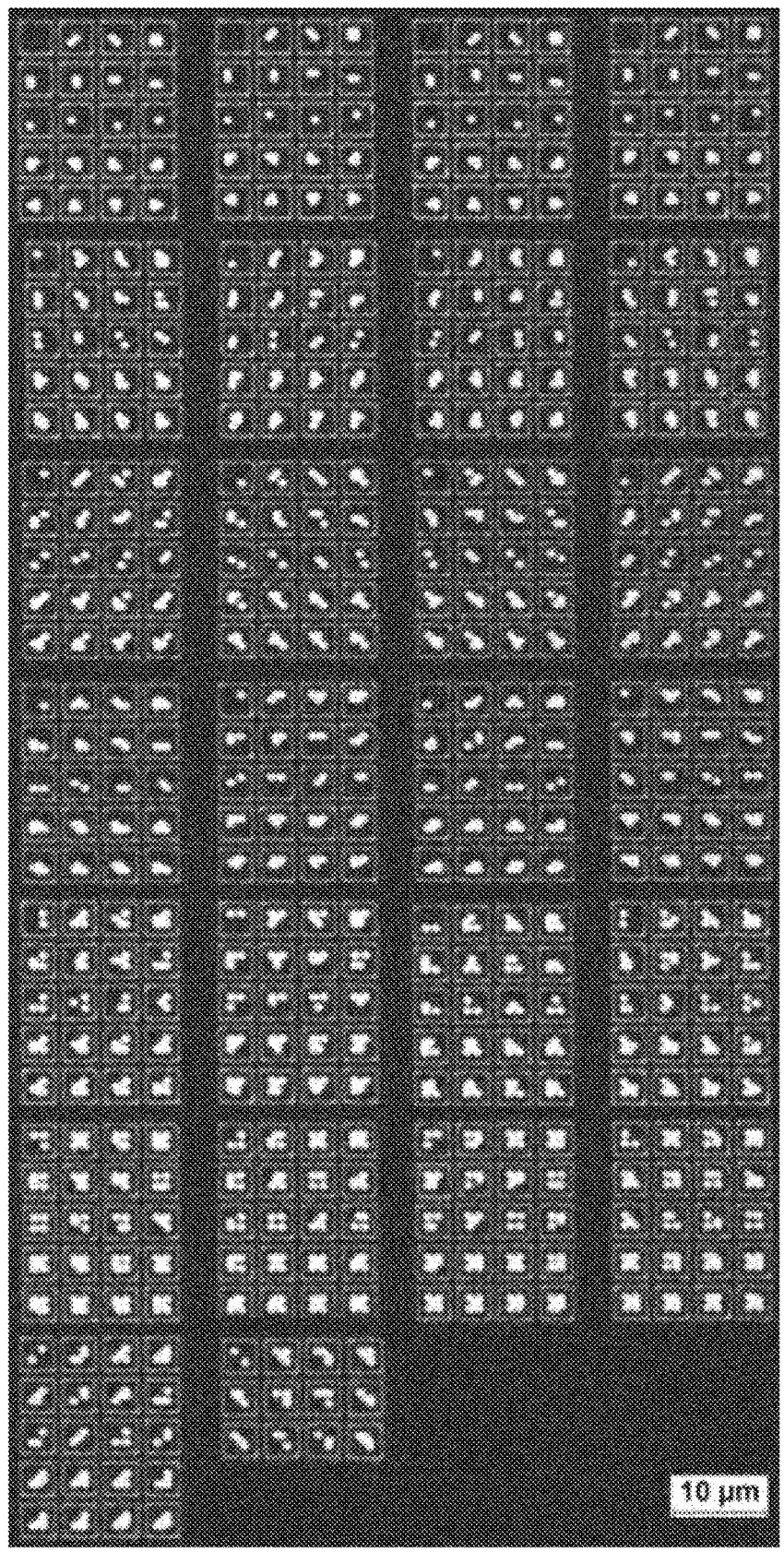

INFORMATION STORAGE METHOD AND INFORMATION STORAGE MEDIUM WITH INCREASED STORAGE DENSITY BY MULTI-BIT CODING

CROSS REFERENCE TO RELATED APPLICATIONS

This is a continuation of U.S. patent application Ser. No. 18/003,962, filed Dec. 30, 2022, which is a national phase of International (PCT) Application Serial No. PCT/EP2021/053894, filed Feb. 17, 2021. International (PCT) Application Serial No. PCT/EP2021/053894 is also a Continuation in Part of International (PCT) Application Serial No. PCT/EP2020/072872, filed Aug. 14, 2020 and International (PCT) Application Serial No. PCT/EP2020/068892, filed Jul. 3, 2020. Priority is claimed to these applications, and they are incorporated herein by reference in their entireties.

INTRODUCTION

The invention relates to a method for storage of information and to an information storage medium with increased storage capacity.

With increasing amounts of data being generated day after day improved storage techniques are of utmost importance. It is, in particular, important to increase the storage capacity for data per area or per storage device in order to offer more efficient ways of data storage. Over decades, CDs, DVDs and BluRay Discs were important digital information storage media with the increased storage capacity developed over time being caused by the size of the structures on the one hand and the wavelength being used for decoding on the other hand.

There is, however, a need to provide an improved method for storage of information as well as an improved information storage medium in terms of storage capacity. The present invention offers different approaches which, either alone or in combination, may achieve this object.

SUMMARY

According to a first aspect, the present invention relates to a method for storage of information comprising the steps of providing a substrate; and creating a plurality of recesses in a surface of the substrate by using a laser and/or a focused particle beam in order to encode information on the substrate; wherein the plurality of recesses have different shapes and/or sizes and wherein each shape and/or size corresponds to a predefined value of information. In other words, the present invention uses a third dimension by not only using a specific spot (e.g., x- and y-dimension) in order to encode information (due to a recess being present or not being present), but in addition uses a shape and/or size of each recess to encode additional information. For example, various circular recesses of different diameters may be used to encode different values of information. Alternatively, ellipsoidal recesses having different orientations (corresponding to recesses of different shapes) may be used to encode values of information. These concepts may even be combined by using, e.g., ellipsoids having both different orientations and different sizes in order to further increase storage capacity.

Optionally, the plurality of recesses may also have different depths which each depth also corresponding to a predefined value of information. The latter concept has been described in great detail in PCT (Int'l) Application Publication No. WO 2022/002418 for ceramic substrates. This document is fully incorporated herein by reference, in particular with regard to any disclosure therein explaining and detailing how to encode information by means of recess depth. As will be appreciated by the skilled person, this concept may also be utilized for substrates other than ceramic substrates.

The concept of this first aspect of the present invention may also be employed for a stack of material layers. Accordingly, the present invention further relates to a method for storage of information comprising the steps of providing a substrate; coating the substrate with a layer of a second material different from the material of the substrate; and creating a plurality of recesses in a surface of the layer of the second material by using a laser and/or a focused particle beam in order to encode information in the layer of the second material; wherein the plurality of recesses have different shapes and/or sizes and wherein each shape and/or size corresponds to a predefined value of information. Again, the plurality of recesses may also have different depths with each depth corresponding to a predefined value of information. The coated substrate may optionally be tempered before and/or after information encoding to improve the durability of the coated substrate. This tempering step is particularly advantageous for certain ceramic substrates and specific second materials. This has been described in great detail in PCT (Int'l) Application Publication No. WO 2021/028035, the entire content of which is incorporated herein by reference, in particular with regard to any disclosure relating to these preferred material combinations and the advantages and effects of the tempering.

A substrate and a coating thereon (and optionally further additionally layers) offer the advantage to use a rather specific and potentially more expensive material for the coating, which can particularly easily be manipulated by a laser or a focused particle beam. The substrate, in this case, merely provides a durable base material for the coating layer which, in fact, encodes the information. Using a substrate and a coating also allows for providing an optical contrast (or other contrasts which may be read out by a suitable reading device) between spots of coating being present and spots of no coating, where the substrate material may be read out. This effect is described in detail for ceramic substrates in the above-referenced '035 Publication, the content of which is also in this regard incorporated herein by reference.

If a stack of even more material layers is used and if the plurality of recesses have different depths the material differences between subsequent layers may be employed in combination with the recess depth in order to encode further information by, e.g., creating a color effect. This is described in great detail in the above-referenced '418 Publication, the content of which is hereby incorporated by reference, in particular with regard to these facts just mentioned. Accordingly, the present invention further relates to a method for storage of information comprising the steps of providing a substrate; coating the substrate with two or more layers of different second materials being different from the material of the substrate; and creating a plurality of recesses in the layers of the second materials by using a laser and/or a focused particle beam in order to encode information in the layers of the second materials; wherein the plurality of recesses have different shapes and/or sizes and different depths and extend into different layers of the two or more layers and wherein each shape and/or size and each depth corresponds to a predefined value of information. Again, the coated substrate may optionally be tempered before and/or after information encoding to improve the durability of the coated substrate. As outlined above, this is particularly advantageous in case certain ceramic substrates and certain second materials are being used.

If two or more layers are coated on a substrate, it is preferred that the two or more layers each have a thickness smaller than 1 µm, preferably smaller than 100 nm and more preferably smaller than 10 nm. It is also preferred that the two or more layers comprise a metal layer and a metal oxide layer, wherein the metal element of the metal layer and the metal element of the metal oxide layer are preferably identical.

For all of the three alternatives of this first aspect of the present invention it is preferred that the recesses of different shape have a different shape in a cross-section perpendicular to the depth direction. Alternatively, or additionally, the recesses of different size have a different size in a cross-section perpendicular to the depth direction, preferably a different cross-sectional area. Thus, the different shapes and/or sizes may be most efficiently imaged or read out along an axis perpendicular to the substrate or coating surface.

Preferably, the plurality of recesses are arranged in a regular 2D pattern. A particularly preferred regular 2D pattern is a rectangular, preferably square, matrix or array with a single recess or no recess being present per rectangle or square of said matrix or array. Such an arrangement allows for an increased storage density in comparison to, e.g., optical discs which require a certain track pitch thus eliminating a substantial portion of the overall surface for storage of data. A preferred regular 2D pattern having even further enhanced storage density is a hexagonal pattern.

The plurality of recesses may have at least 2, at least 3, at least 4, at least 5, at least 6, at least 7, at least 8, at least 16 or at least 32 different shapes and/or sizes and/or depths with each shape and/or size and/or depth corresponding to a predefined value of information. Of course, the number of different sizes need not correspond to the number of different shapes and/or depths. For example, if an ellipsoidal shape is chosen for each recess, there may be four different orientations of said ellipsoid, two differently sized ellipsoids and eight different depths, which allows for encoding 6 different bits of information or 64 different values of information per recess. Consequently, the storage density, in this example, is increased by a factor of six as compared to a pattern of recesses having a single shape, size and depth only.

Of course, the different shapes need not be created by differently oriented recesses of the same base shape such as an ellipsoid. Rather, it is also envisaged to use, e.g., a square recess, a circular recess and, e.g., a line recess with different orientations. Moreover, it is also possible to use two or more different recesses which differ both in size and shape. For example, if the laser being used in the inventive method creates, in general, circular recesses, one may generate either a single circular recess or two circular recesses next to each other generating a slightly elongated shape, which differs in size and shape from the circular recess.

Preferably, each recess is formed by one or more pulses of the laser and/or focused particle beam. The shape of each recess may be controlled by one or a combination of optical proximity control, polarization ablation, variable shaped beam technology or by two or more circular recesses overlapping each other in certain orientations. For example, one may create a triangular shape by positioning three recesses in a triangular pattern next to each other with sufficient overlap to basically generate a triangular recess. Similarly, four recesses may be generated to create a rectangular or square recess. Two or more recesses may also form a line-shaped recess which could have different orientations.

The size of each recess may be controlled by one or a combination of pulses, intensity levels or size of the focal spot. For example, if a laser beam having a focus with a conical shape is being used, several pulses and/or pulses of higher intensity level will not only achieve a recess having increased depth but, due to the conical shape, at the same lead to a larger cross-section of the recess at its upper end (at the surface). If depth and size of each recess need be controlled independently from each other, the focal spot may be manipulated in order to chance the size of the recess. As it will be cumbersome and time-consuming to adapt the focal spot of the laser beam for each single recess, it is preferred to first create all recesses having a first size, to then manipulate the focal spot in order to subsequently create all recesses having a second different size.

The depth of each recess may be controlled by one or a combination of the following parameters: energy of the pulses, duration of the pulses, number of pulses of the laser and/or focused particle beam.

If different depths are employed, the minimum depth difference between the plurality of recesses is at least one 1 nm, preferably at least 10 nm, more preferably at least 30 nm, more preferably at least 50 nm, even more preferably at least 70 nm and most preferably at least 100 nm. The minimum depth difference between the plurality of recesses is at most 5 µm, preferably at most 1 µm, more preferably at most 500 nm, more preferably at most 300 nm, even more preferably at most 200 nm and most preferably at most 100 nm.

In general, any material may be utilized for the substrate of the present invention, which may either be manipulated by a laser and/or particle beam or which is sufficiently stable and durable to form a base material to be coated as discussed above. It is, however, particularly preferred that the substrate is a ceramic substrate as explained in the above-referenced '035 Publication.

The ceramic substrate preferably comprises an oxidic ceramic substrate. The ceramic substrate preferably comprises at least 90%, preferably at least 95% by weight of one or a combination of $Al_2O_3$, $TiO_2$, $SiO_2$, $ZrO_2$, $ThO_2$, $MgO$, $Cr_2O_3$, $Zr_2O_3$, $V_2O_3$ or any other oxidic ceramic material. The ceramic substrate preferably comprises a glassy transparent ceramic material or a crystalline ceramic material. The ceramic substrate preferably comprises one or a combination of: sapphire ($Al_2O_3$), silica ($SiO_2$), zirconium ($Zr(SiO_4)$), $ZrO_2$. Particularly preferred substrate materials, which inter alia allow for achieving substrate thicknesses smaller than 200 µm are silicon oxide, aluminum oxide, boron oxide, sodium oxide, potassium oxide, lithium oxide, zinc oxide and magnesium oxide. Reference is in this regard made to EP 4044182.

The ceramic substrate preferably comprises a non-oxidic ceramic substrate. The ceramic substrate preferably comprises at least 90%, preferably at least 95% by weight of one or a combination of a metal nitride such as CrN, CrAlN, TiN, TiCN, TiAlN, ZrN, AlN, VN, $Si_3N_4$, ThN, HfN, BN, a metal carbide such as TiC, CrC, $Al_4C_3$, VC, ZrC, HfC, ThC, $B_4C$, SiC, a metal boride such as $TiB_2$, $ZrB_2$, $CrB_2$, $VB_2$, $SiB_6$, $ThB_2$, $HfB_2$, $WB_2$, $WB_4$; and a metal silicide such as $TiSi_2$, $ZrSi_2$, $MoSi_2$, $MoSi$, $WSi_2$, $PtSi$, $Mg_2Si$ or any other non-oxidic ceramic material. Preferably, the ceramic substrate comprises one or a combination of Ni, Cr, Co, Fe, W, Mo or other metals with a melting point above 1,400° C. Preferably, the ceramic material and the metal form a metal matrix composite. Preferably, the metal amounts to 5-30% by weight, more preferably 10-20% per weight of the ceramic substrate. It is particularly preferred that the ceramic substrate comprises WC/Co—Ni—Mo, BN/Co—Ni—Mo, TiN/Co—Ni—Mo and/or SiC/Co—Ni—Mo.

The second material(s) may be any material which may be suitably manipulated by a laser and/or particle beam in order to generate the recesses of the present invention. However, certain materials are particularly preferred for the second material(s), in particular if used in combination with the above-mentioned ceramic materials of the substrate, as outlined in detail in the above-referenced '035 Publication. Preferably, the second material(s) comprise(s) at least one of a metal such as Cr, Co, Ni, Fe, Al, Ti, Si, W, Zr, Ta, Th, Nb, Mn, Mg, Hf, Mo, V or a ceramic material such as a metal nitride such as CrN, CrAlN, TiN, TiCN, TiAlN, ZrN, AlN, VN, $Si_3N_4$, ThN, HfN, BN, a metal carbide such as TiC, CrC, $Al_4C_3$, VC, ZrC, HfC, ThC, $B_4C$, SiC, an metal oxide such as $Al_2O_3$, $TiO_2$, $SiO_2$, $ZrO_2$, $ThO_2$, MgO, $Cr_2O_3$, $Zr_2O_3$, $V_2O_3$, a metal boride such as $TiB_2$, $ZrB_2$, $CrB_2$, $VB_2$, $SiB_6$, $ThB_2$, $HfB_2$, $WB_2$, $WB_4$, or a metal silicide such as $TiSi_2$, $ZrSi_2$, $MoSi_2$, MoSi, $WSi_2$, PtSi, $Mg_2Si$, or any other ceramic material, preferably wherein the second material comprises CrN, $Cr_2O_3$ and/or CrAlN.

The technique of how the recesses are created is not decisive for the present invention as long as the size and shape as well as optionally the depth may be well-controlled by said technique. Preferably, creating the recesses comprises locally heating the surface (of the substrate or the coating) to at least a melting temperature and/or a decomposition temperature of the second material(s), preferably to a temperature of at least 3,000° C., more preferably at least 3,200° C., even more preferably at least 3,500° C. and most preferably at least 4,000° C. It is also preferred to create recesses by treating the surface of the (coated) substrate with a femtosecond-laser in order to cause so-called Coulomb explosions leading to material ablation.

The layer of the second material and/or the two or more layers of different second materials preferably has/have a thickness no greater than 5 μm, preferably no greater than 2 μm, more preferably no greater than 1 μm, even more preferably no greater than 100 nm and most preferably no greater than 10 nm.

Creating the recesses may comprise locally heating, decomposing, oxidizing, ablating and/or vaporizing the surface of the substrate or coating.

As outlined above, it may be beneficial to temper the coated substrate before and/or after information encoding to improve the durability of the coated substrate as again described in detail in the above-referenced '035 Publication. This is particularly preferred if a ceramic substrate is being used. This tempering preferably generates a sintered interface between the ceramic substrate and the layer of the second material or the two or more layers of different second materials. Preferably, said sintered interface comprises at least one element from both the substrate material and the second material(s). Tempering may take place in an oxygen atmosphere which may cause oxidation of at least a top most sub-layer of the layer of the second material(s).

The inventive method may allow for achieving an increased storage capacity. Preferably, areas of the (coated) substrate comprise at least 1 Megabyte of information per $cm^2$, more preferably at least 10 Megabytes of information per $cm^2$, even more preferably at least 100 Megabytes of information per $cm^2$, even more preferably at least 1 Gigabyte of information per $cm^2$ and most preferably at least 10 Gigabytes of information per $cm^2$.

The invention according to this first aspect also relates to a corresponding information storage medium resulting from the methods discussed above. Accordingly, the present invention relates to an information storage medium comprising a substrate, wherein the surface of the substrate comprises a plurality of recesses encoding the information on the information storage medium, wherein the plurality of recesses have different shapes and/or sizes and wherein each shape and/or size corresponds to a predefined value of information. As discussed above the plurality of recesses may also have different depths with each depth corresponding to a predefined value of information.

The present invention further relates to an information storage medium comprising a substrate coated with a layer of a second material, wherein the second material is different from the material of the substrate, wherein the layer of the second material comprises a plurality of recesses encoding information on the information storage medium, wherein the plurality of recesses have different shapes and/or sizes and wherein each shape and/or size corresponds to a predefined value of information. The information storage medium may further comprise an optional sintered interface between the substrate and the layer of the second material wherein said sintered interface comprises at least one element from both the substrate material and the second material. This sintered interface is particularly preferred if the substrate comprises a ceramic material. As mentioned above, the plurality of recesses may also have different depths with each depth corresponding to a predefined value of information.

The present invention further relates to an information storage medium comprising a substrate coated with two or more layers of different second materials, wherein the second materials are different from the material of the substrate, wherein the information storage medium comprises a plurality of recesses encoding information on the information storage medium, wherein the plurality of recesses have different shapes and/or sizes and different depths and extend into different layers of the two or more layers and wherein each shape and/or size and each depth corresponds to a predefined value of information. Again, an optional sintered interface may be present between the substrate and the bottommost layer of the two or more layers, wherein the sintered interface comprises at least one element from both the substrate material and the material of the bottommost layer.

The optional and preferred features discussed above in the context of the inventive method may, of course, also employed for the inventive information storage media.

If two or more layers are coated on the information storage medium, it is preferred that the two or more layers each have a thickness smaller than 1 μm, preferably smaller than 100 nm and more preferably smaller than 10 nm. It is also preferred that the two or more layers comprise a metal layer and a metal oxide layer, wherein the metal element of the metal layer and the metal element of the metal oxide layer are preferably identical.

It is also preferred that the recesses of different shapes have a different shape in a cross-section perpendicular to the depth direction and/or wherein recesses of different size have a different size in a cross-section perpendicular to the depth direction, preferably a different cross-sectional area.

It is also preferred that the plurality of recesses have at least two, preferably at least three, more preferably at least four, even more preferably at least five, even more preferably at least six, even more preferably at least seven, even more preferably at least eight, even more preferably at least sixteen and most preferably at least thirty-two different shapes and/or sizes and/or depths and wherein each shape and/or size and/or depth corresponds to a predefined value of information.

Furthermore, it is preferred that the minimum depth difference between the plurality of recesses is at least 1 nm, preferably at least 10 nm, more preferably at least 30 nm, more preferably at least 50 nm, even more preferably at least 70 nm, and most preferably at least 100 nm. Preferably, the minimum depth difference between the plurality of recesses is at most 5 µm, preferably at most 1 µm, more preferably at most 500 nm, more preferably at most 300 nm, even more preferably at most 200 nm, and most preferably at most 100 nm.

The ceramic substrate preferably comprises an oxidic ceramic. The ceramic substrate preferably comprises at least 90%, preferably at least 95%, by weight of one or a combination of $Al_2O_3$, $TiO_2$, $SiO_2$, $ZrO_2$, $ThO_2$, MgO, $Cr_2O_3$, $Zr_2O_3$, $V_2O_3$ or any other oxidic ceramic material.

The ceramic substrate preferably comprises a glassy transparent ceramic material or a crystalline ceramic material. The ceramic substrate preferably comprises one or a combination of: sapphire ($Al_2O_3$), silica ($SiO_2$), zirconium ($Zr(SiO_4)$), $ZrO_2$. Particularly preferred substrate materials, which inter alia allow for achieving substrate thicknesses smaller than 200 µm are silicon oxide, aluminum oxide, boron oxide, sodium oxide, potassium oxide, lithium oxide, zinc oxide and magnesium oxide.

Further, the ceramic substrate preferably comprises a non-oxidic ceramic. The ceramic substrate preferably comprises at least 90%, preferably at least 95%, by weight of one or a combination of a metal nitride such as CrN, CrAlN, TiN, TiCN, TiAlN, ZrN, AlN, VN, $Si_3N_4$, ThN, HfN, BN; a metal carbide such as TiC, CrC, $Al_4C_3$, VC, ZrC, HfC, ThC, $B_4C$, SiC; a metal boride such as $TiB_2$, $ZrB_2$, $CrB_2$, $VB_2$, $SiB_6$, ThB, $HfB_2$, $WB_2$, $WB_4$ and a metal silicide such as $TiSi_2$, $ZrSi_2$, $MoSi_2$, MoSi, $WSi_2$, PtSi, $Mg_2Si$, or any other non-oxidic ceramic material.

Preferably, the ceramic substrate comprises one or a combination of Ni, Cr, Co, Fe, W, Mo or other metals with a melting point above 1,400° C. Preferably, the ceramic material and the metal form a metal matrix composite. Preferably, the metal amounts to 5-30% by weight, more preferably 10-20% per weight of the ceramic substrate. It is particularly preferred that the ceramic substrate comprises WC/Co—Ni—Mo, BN/Co—Ni—Mo, TiN/Co—Ni—Mo and/or SiC/Co—Ni—Mo.

Preferably, the second material(s) comprise(s) at least one of a metal such as Cr, Co, Ni, Fe, Al, Ti, Si, W, Zr, Ta, Th, Nb, Mn, Mg, Hf, Mo, V or a ceramic material such as a metal nitride such as CrN, CrAlN, TiN, TiCN, TiAlN, ZrN, AlN, VN, $Si_3N_4$, ThN, HfN, BN, a metal carbide such as TiC, CrC, $Al_4C_3$, VC, ZrC, HfC, ThC, $B_4C$, SiC, a metal oxide such as $Al_2O_3$, $TiO_2$, $SiO_2$, $ZrO_2$, $ThO_2$, MgO, $Cr_2O_3$, $Zr_2O_3$, $V_2O_3$, a metal boride such as $TiB_2$, $ZrB_2$, $CrB_2$, $VB_2$, $SiB_6$, $ThB_2$, $HfB_2$, $WB_2$, $WB_4$, or a metal silicide such as $TiSi_2$, $ZrSi_2$, $MoSi_2$, MoSi, $WSi_2$, PtSi, $Mg_2Si$, or any other ceramic material. Particularly preferred second materials comprise CrN, $Cr_2O_3$ and/or CrAlN.

Preferably, the information storage medium comprises an oxide layer on top of the second material(s), wherein the oxide layer preferably comprises one or more oxides of the second material or of the material of the topmost layer of the two or more layers of different second materials.

Preferably, the layer(s) of the second material(s) has/have a thickness no greater than 10 µm, preferably no greater than 3 µm, even more preferably no greater than 1 µm, even more preferably no greater than 100 nm, even more preferably no greater than 10 nm.

Areas of the information storage medium preferably comprise at least 1 Megabyte of information per $cm^2$, preferably at least 10 Megabytes of information per $cm^2$, more preferably at least 100 Megabytes of information per $cm^2$, even more preferably at least 1 Gigabyte of information per $cm^2$, even more preferably at least 10 Gigabytes of information per $cm^2$.

The melting temperature of the, preferably ceramic, substrate, the sintered layer and the layer of the second material or the two or more layers of different second materials is preferably greater than 1,000° C., preferably greater than 1,200° C., more preferably greater than 1,300° C. The melting temperature of the, preferably ceramic, substrate is preferably equal to or greater than the melting temperature of the layer of the second material or the two or more layers of different second materials.

The inventive information storage medium may be used for long-term information storage, in particular if a ceramic material is employed for the substrate. Accordingly, the present invention further relates to a use of the information storage medium discussed above for long-term information storage, wherein the information storage medium is preferably stored for a period of at least 10 years, preferably at least 100 years, more preferably at least 1,000 years, more preferably at least 10,000 years and even more preferably at least 100,000 years.

The present invention further relates to a method of decoding information encoded on the information storage medium as discussed above. The method of decoding comprises the steps of providing the information storage medium discussed above, measuring the shape and/or size, and optionally the depth, of at least a subset of the plurality of recesses, and decoding the values of information corresponding to the measured shapes and/or sizes and optionally the measured depths.

Preferably, measuring the shape and/or size and optionally the depth, is performed using a laser beam and/or a focused article beam such as an electron beam.

Preferably, measuring the shape and/or size and optionally the depth is based on one or a combination of: interference, reflection, absorption, ellipsometry, frequency comb technique, fluorescence microscopy such as STED or STORM, structured illumination, super-resolution microscopy, optical coherence tomography, ptychography, scanning electron microscopy, digital (immersion) microscopy (using reflected or transmitted light). The high resolution achieve by the optical technique may be further enhanced by pattern recognition utilizing well-known AI techniques.

According to the first aspect of the present invention discussed above, a third dimension (in addition to the x and y coordinates of the recesses) is being used in order to increase storage capacity, wherein said "third dimension" may be either the depth of the recess or the type (shape and/or size) of the recess. By combining depth and type, even more information may be stored within the same surface area.

According to another, second aspect of the present invention discussed further below, storage capacity is increased by changing the pattern of the recesses (within the x-y-surface) in order to allow for more permutations of recess patterns.

The invention according to this second aspect (an exemplary embodiment of which is shown schematically in FIG. 5a and FIG. 5b) inter alia refers to a method for storage of information comprising the steps of providing a substrate; and creating a plurality of recesses in a surface of the substrate by using a laser and/or a focused particle beam in order to encode information on the substrate. The plurality of recesses are located at a subset of first predetermined positions and/or at a subset of second predetermined positions, wherein the first predetermined positions define a regular pattern with a center-to-center distance between directly adjacent positions corresponding to at least 75% and to at most 150% of the maximum cross-sectional dimension of the recesses, wherein the second predetermined positions define a regular pattern with a center-to-center distance between directly adjacent positions corresponding to at least 75% and to at most 150% of the maximum cross-sectional dimension of the recesses, wherein the center-to-center distance between any of the first predetermined positions and the directly adjacent second predetermined position is smaller than 75% of the maximum cross-sectional dimension of the recesses, and wherein for each pair of directly adjacent first and second predetermined positions only one of these directly adjacent first and second predetermined positions is occupied by a recess.

In essence, this aspect of the present invention is based on the idea to utilize inter-matrix positions in order to achieve additional potential positions for recesses to encode additional bits of data. For example, if one starts out with a square matrix as the subset of first predetermined positions, one would typically allow one circular recess to be present for each square unit cell of the square matrix in such a manner that adjacent circular recesses just or barely touch each other. This allows for a certain number of permutations for one up to $N^2$ recesses being present if the side length of the square matrix allows for N recesses to be placed adjacent to each other. Yet, the present invention, in addition, utilizes a subset of second predetermined positions also defining a regular pattern with a center-to-center distance between directly adjacent position corresponding to at least 75% and to at most 150% of the maximum cross-sectional dimension of the recesses. But the center-to-center distance between any of the first predetermined positions and a directly adjacent second predetermined position is smaller than 75% of the maximum cross-sectional dimension of the recesses. In other words, the subset of second predetermined positions is shifted with respect to the subset of first predetermined positions. For example, said shift may correspond to one half of the center-to-center distance between directly adjacent positions of the first predetermined positions. Accordingly, an additional position for a potential recess is offered exactly between two positions for recesses previously present. Since it may not be possible to distinguish, during decoding, between a situation with two adjacent first predetermined positions being occupied and the situation with those two positions and a third position in between being occupied, the present invention suggests to utilize only either of these two scenarios. Accordingly, for each pair of directly adjacent first and second predetermined positions only one of these directly adjacent first and second predetermined positions is occupied by a recess. In terms of decoding, this merely requires that one can distinguish between a circular recess being present at a certain first position and said same recess being present at position shifted by, e.g., one radius of said circular recess. Utilizing this technique, the storage capacity per surface area may be substantially increased.

Since there may be a certain variation in the center-to-center distances and/or the maximum cross-sectional dimension of the recesses, the above-mentioned criterium may apply only on average, i.e. the first predetermined positions may define a regular pattern with an average center-to-center distance between directly adjacent positions corresponding to at least 75% and to at most 150% of the average maximum cross-sectional dimension of the recesses, and the second predetermined positions may define a regular pattern with an average center-to-center distance between directly adjacent positions corresponding to at least 75% and to at most 150% of the average maximum cross-sectional dimension of the recesses, wherein the center-to-center distance between any of the first predetermined positions and the directly adjacent second predetermined position is smaller than 75% of the average maximum cross-sectional dimension of the recesses.

In order to be on the safe side one may also define a stricter criterium. Accordingly, the first predetermined positions may define a regular pattern with a largest center-to-center distance between directly adjacent positions corresponding to at least 75% and to at most 150% of the smallest maximum cross-sectional dimension of the recesses, and the second predetermined positions may define a regular pattern with a largest center-to-center distance between directly adjacent positions corresponding to at least 75% and to at most 150% of the smallest maximum cross-sectional dimension of the recesses, wherein the center-to-center distance between any of the first predetermined positions and the directly adjacent second predetermined position is smaller than 75% of the smallest maximum cross-sectional dimension of the recesses.

In order to allow for a reliable distinction between first and second positions, it is preferred that the center-to-center distance between any of the first predetermined positions and the directly adjacent second predetermined position is smaller than the 70%, preferably smaller than 65%, more preferably smaller than 60% and even more preferably smaller than 55% of the (smallest or average) maximum cross-sectional dimension of the recesses.

In order to ensure that adjacent recesses are properly separated from one another, it is further preferred that the first predetermined positions define a regular pattern with a (average) center-to-center distance between directly adjacent positions corresponding to at least 105%, preferably at least 110%, more preferably at least 115% of the (average or largest) maximum cross-sectional dimension of the recesses, wherein the second predetermined positions define a regular pattern with a center-to-center distance between directly adjacent positions corresponding to at least 105%, preferably at least 110%, more preferably at least 115% of the (average or largest) maximum cross-sectional dimension of the recesses.

Similar to the first aspect of the present invention discussed above, this second aspect of the present invention may also be utilized for recesses in a substrate or recesses in a coating.

Accordingly, the present invention further relates to a method for storage of information (an exemplary embodiment of which is shown schematically in FIG. 6) comprising the steps of providing a substrate and coating the substrate with a layer of a second material different from the material of the substrate as well as creating a plurality of recesses in a surface of the layer of the second material by using a laser and/or a focused particle beam in order to encode information in the layer of the second material. The plurality of recesses are located at a subset of first predetermined positions and/or at a subset of second predetermined positions, wherein the first predetermined positions define a regular pattern with a center-to-center distance between directly adjacent positions corresponding to at least 75% and to at most 150% of the maximum cross-sectional dimension of the recesses, wherein the second predetermined positions define a regular pattern with a center-to-center distance between directly adjacent positions corresponding to at least 75% and to at most 150% of the maximum cross-sectional dimension of the recesses, wherein the center-to-center distance between any of the first predetermined positions and a directly adjacent second predetermined position is smaller than 75% of the maximum cross-sectional dimension of the recesses, and wherein for each pair of directly adjacent first and second predetermined positions only one of these directly adjacent first and second predetermined positions is occupied by a recess.

Of course, the above-discussed features as to limits and averages apply as well to this method.

If the above discussed scenario with two directly adjacent recesses on the one hand and a third recess in between on the other hand is optically (or by means of any other technique) distinguishable during decoding, even further positions may be utilized for additional recesses. Accordingly, the present invention further relates to a method for storage of information comprising the steps of providing a substrate and creating a plurality of recesses in a surface of the substrate by using a laser and/or a focused particle beam in order to encode information on the substrate. The plurality of recesses are located at a subset of first predetermined positions and/or at a subset of second predetermined positions, wherein the first predetermined positions define a regular pattern with a center-to-center distance between directly adjacent positions corresponding to at least 75% and to at most 150% of the maximum cross-sectional dimension of the recesses, wherein the second predetermined positions define a regular pattern with a center-to-center distance between directly adjacent positions corresponding to at least 75% and to at most 150% of the maximum cross-sectional dimension of the recesses, wherein the center-to-center distance between any of the first predetermined positions and a directly adjacent second predetermined position is smaller than 75% of the maximum cross-sectional dimension of the recesses.

Again, this concept may be used for recesses in a substrate or recesses in a coating. Thus, the present invention further relates to a method for storage of information comprising the steps of providing a substrate and coating the substrate with a layer of a second material different from the material of the substrate and creating a plurality of recesses in a surface of the layer of the second material by using a laser and/or a focused particle beam in order to encode information in the layer of the second material. The plurality of recesses are located at a subset of first predetermined positions and/or at a subset of second predetermined positions, wherein the first predetermined positions define a regular pattern with a center-to-center distance between directly adjacent positions corresponding to at least 75% and to at most 150% of the maximum cross-sectional dimension of the recesses, wherein the second predetermined positions define a regular pattern with a center-to-center distance between directly adjacent positions corresponding to at least 75% and to at most 150% of the maximum cross-sectional dimension of the recesses, wherein the center-to-center distance between any of the first predetermined positions and a directly adjacent second predetermined position is smaller than 75% of the maximum cross-sectional dimension of the recesses.

Again, the preferred ranges for the distances discussed above apply to this alternative as well.

In the latter two cases, it is preferred that the regular pattern of the first predetermined positions defines a pattern of voids if all of the first predetermined positions are occupied, wherein each of the second predetermined positions completely covers a void if occupied. It is further preferred that each center of each of the second predetermined positions corresponds to a center of one of the voids.

As mentioned above, the regular pattern of the first predetermined positions may be, e.g., a square pattern. However, other regular patterns such as, e.g., a hexagonal pattern may also be employed.

Preferably, the shape of the recesses is cylindrical or cone-like. Cylindrical or substantially cylindrical recesses are particularly preferred because they make decoding less prone to errors, in particular in case of a rather dense pattern. It is thus preferred that the cross-sectional area of the recess at the bottom of the recess corresponds to at least 50%, more preferably at least 70%, more preferably at least 80%, even more preferably at least 90% of the cross-sectional area of the recess at the top or edge of the recess. Preferably, the recesses are created using a laser beam with a Bessel beam shape as this allows for creating cylindrical or substantially cylindrical recesses.

The preferred and optional features discussed above with respect to the first aspect of the present invention may be analogously employed for this second aspect of the present invention. In particular, the concept of inter-matrix positions for recesses may also be combined with recesses having different shape and/or size and/or depth.

The ceramic substrate preferably comprises an oxidic ceramic. The ceramic substrate preferably comprises at least 90%, preferably at least 95%, by weight of one or a combination of $Al_2O_3$, $TiO_2$, $SiO_2$, $ZrO_2$, $ThO_2$, MgO, $Cr_2O_3$, $Zr_2O_3$, $V_2O_3$ or any other oxidic ceramic material. The ceramic substrate preferably comprises a glassy transparent ceramic material or a crystalline ceramic material. The ceramic substrate preferably comprises one or a combination of: sapphire ($Al_2O_3$), silica ($SiO_2$), zirconium (Zr ($SiO_4$)), $ZrO_2$. Particularly preferred substrate materials, which inter alia allow for achieving substrate thicknesses smaller than 200 μm are silicon oxide, aluminum oxide, boron oxide, sodium oxide, potassium oxide, lithium oxide, zinc oxide and magnesium oxide.

Further, the ceramic substrate preferably comprises a non-oxidic ceramic. The ceramic substrate preferably comprises at least 90%, preferably at least 95%, by weight of one or a combination of a metal nitride such as CrN, CrAlN, TiN, TiCN, TiAlN, ZrN, AlN, VN, $Si_3N_4$, ThN, HfN, BN; a metal carbide such as TiC, CrC, $Al_4C_3$, VC, ZrC, HfC, ThC, $B_4C$, SiC; a metal boride such as $TiB_2$, $ZrB_2$, $CrB_2$, $VB_2$, $SiB_6$, ThB, $HfB_2$, $WB_2$, $WB_4$ and a metal silicide such as $TiSi_2$, $ZrSi_2$, $MoSi_2$, MoSi, $WSi_2$, PtSi, $Mg_2Si$, or any other non-oxidic ceramic material. Preferably, the ceramic substrate comprises one or a combination of Ni, Cr, Co, Fe, W, Mo or other metals with a melting point above 1,400° C. Preferably, the ceramic material and the metal form a metal matrix composite. Preferably, the metal amounts to 5-30% by weight, more preferably 10-20% per weight of the ceramic substrate. It is particularly preferred that the ceramic substrate comprises WC/Co—Ni—Mo, BN/Co—Ni—Mo, TiN/Co—Ni—Mo and/or SiC/Co—Ni—Mo.

The second material(s) preferably comprise(s) at least one of a metal such as Cr, Co, Ni, Fe, Al, Ti, Si, W, Zr, Ta, Th, Nb, Mn, Mg, Hf, Mo, V or a ceramic material such as a metal nitride such as CrN, CrAlN, TiN, TiCN, TiAlN, ZrN, AlN, VN, $Si_3N_4$, ThN, HfN, BN, a metal carbide such as TiC, CrC, $Al_4C_3$, VC, ZrC, HfC, ThC, $B_4C$, SiC, an metal oxide such as $Al_2O_3$, $TiO_2$, $SiO_2$, $ZrO_2$, $ThO_2$, MgO, $Cr_2O_3$, $Zr_2O_3$, $V_2O_3$, a metal boride such as $TiB_2$, $ZrB_2$, $CrB_2$, $VB_2$, $SiB_6$, $ThB_2$, $HfB_2$, $WB_2$, $WB_4$ or a metal silicide such as $TiSi_2$, $ZrSi_2$, $MoSi_2$, MoSi, $WSi_2$, PtSi, $Mg_2Si$ or any other ceramic material. Preferably, the second material(s) comprise(s) CrN, $Cr_2O_3$ and/or CrAlN.

The layer of the second material and/or the two or more layers of different second materials preferably has/have a thickness no greater than 5 µm, preferably no greater than 2 µm, more preferably no greater than 1 µm, even more preferably no greater than 100 nm and most preferably no greater than 10 nm.

The plurality of recesses preferably have different depths, wherein each depth corresponds to a predefined value of information.

The minimum depth difference between the plurality of recesses is preferably at least 1 nm, preferably at least 10 nm, more preferably at least 30 nm, more preferably at least 50 nm, even more preferably at least 70 nm, and most preferably at least 100 nm. The minimum depth difference between the plurality of recesses is preferably at most 5 µm, preferably at most 1 µm, more preferably at most 500 nm, more preferably at most 300 nm, even more preferably at most 200 nm, and most preferably at most 100 nm.

The present invention according to this second aspect further relates to an information storage medium. The information storage medium compromises a substrate, wherein the surface of the substrate comprises a plurality of recesses encoding information on the information storage medium, wherein the plurality of recesses are located at a subset of first predetermined positions and at a subset of second predetermined positions, wherein the first predetermined positions define a regular pattern with a center-to-center distance between directly adjacent positions corresponding to at least 75% and to at most 150% of the maximum cross-sectional dimension of the recesses, wherein the second predetermined positions define a regular pattern with a center-to-center distance between directly adjacent positions corresponding to at least 75% and to at most 150% of the maximum cross-sectional dimension of the recesses, wherein the center-to-center distance between any of the first predetermined positions and a directly adjacent second predetermined position is smaller than 75% of the maximum cross-sectional dimension of the recesses, and wherein for each pair of directly adjacent first and second predetermined positions only one of these directly adjacent first and second predetermined positions is occupied by a recess.

Again, this concept can be extended to a substrate with a coating and to an inter-matrix code with overlap as discussed above with regard to the method.

Accordingly, the present invention according to this second aspect further relates to an information storage medium comprising a substrate coated with a layer of a second material and an optional sintered interface between the substrate and the layer of the second material, wherein the second material is different from the material of the substrate, wherein the optional sintered interface comprises at least one element from both the substrate material and the second material and wherein the layer of the second material comprises a plurality of recesses encoding information on the information storage medium. The plurality of recesses are located at a subset of first predetermined positions and at a subset of second predetermined positions, wherein the first predetermined positions define a regular pattern with a center-to-center distance between directly adjacent positions corresponding to at least 75% and to at most 150% of the maximum cross-sectional dimension of the recesses, wherein the second predetermined positions define a regular pattern with a center-to-center distance between directly adjacent positions corresponding to at least 75% and to at most 150% of the maximum cross-sectional dimension of the recesses. The center-to-center distance between any of the first predetermined positions and a directly adjacent second predetermined position is smaller than 75% of the maximum cross-sectional dimension of the recesses, and wherein for each pair of directly adjacent first and second predetermined positions only one of these directly adjacent first and second predetermined positions is occupied by a recess.

Of course, the preferred and optional features discussed above with respect to the methods according to the second aspect of the present invention as well as with respect to the methods and media according to the first aspect of the present invention, may also be employed for the information media according to this second aspect of the present invention.

It is preferred that the regular pattern of the first predetermined positions is a square pattern. However, other patterns such as, e.g., a hexagonal pattern may also be employed.

The shape of the recesses is preferably cylindrical or substantially cylindrical or cone-like. As mentioned above, it is particularly preferred that the cross-sectional area at the bottom of a recess corresponds to at least 50%, preferably at least 60%, more preferably at least 70%, even more preferably at least 80% and particularly preferably at least 90% of the cross-sectional area at the top or edge of the recess.

The ceramic substrate preferably comprises an oxidic ceramic. The ceramic substrate preferably comprises at least 90%, preferably at least 95%, by weight of one or a combination of $Al_2O_3$, $TiO_2$, $SiO_2$, $ZrO_2$, $ThO_2$, $MgO$, $Cr_2O_3$, $Zr_2O_3$, $V_2O_3$ or any other oxidic ceramic material.

The ceramic substrate preferably comprises a glassy transparent ceramic material or a crystalline ceramic material. The ceramic substrate preferably comprises one or a combination of: sapphire ($Al_2O_3$), silica ($SiO_2$), zirconium ($Zr(SiO_4)$), $ZrO_2$. Particularly preferred substrate materials, which inter alia allow for achieving substrate thicknesses smaller than 200 µm are silicon oxide, aluminum oxide, boron oxide, sodium oxide, potassium oxide, lithium oxide, zinc oxide and magnesium oxide.

Further, the ceramic substrate preferably comprises a non-oxidic ceramic. The ceramic substrate preferably comprises at least 90%, preferably at least 95%, by weight of one or a combination of a metal nitride such as CrN, CrAlN, TiN, TiCN, TiAlN, ZrN, AlN, VN, $Si_3N_4$, ThN, HfN, BN; a metal carbide such as TiC, CrC, $Al_4C_3$, VC, ZrC, HfC, ThC, $B_4C$, SiC; a metal boride such as $TiB_2$, $ZrB_2$, $CrB_2$, $VB_2$, $SiB_6$, $ThB$, $HfB_2$, $WB_2$, $WB_4$ and a metal silicide such as $TiSi_2$, $ZrSi_2$, $MoSi_2$, MoSi, $WSi_2$, PtSi, $Mg_2Si$, or any other non-oxidic ceramic material.

Preferably, the ceramic substrate comprises one or a combination of Ni, Cr, Co, Fe, W, Mo or other metals with a melting point above 1,400° C. Preferably, the ceramic material and the metal form a metal matrix composite. Preferably, the metal amounts to 5-30% by weight, more preferably 10-20% per weight of the ceramic substrate. It is particularly preferred that the ceramic substrate comprises WC/Co—Ni—Mo, BN/Co—Ni—Mo, TiN/Co—Ni—Mo and/or SiC/Co—Ni—Mo.

Preferably, the second material(s) comprise(s) at least one of a metal such as Cr, Co, Ni, Fe, Al, Ti, Si, W, Zr, Ta, Th, Nb, Mn, Mg, Hf, Mo, V or a ceramic material such as a metal nitride such as CrN, CrAlN, TiN, TiCN, TiAlN, ZrN, AlN, VN, $Si_3N_4$, ThN, HfN, BN, a metal carbide such as TiC, CrC, $Al_4C_3$, VC, ZrC, HfC, ThC, $B_4C$, SiC, an metal oxide such as $Al_2O_3$, $TiO_2$, $SiO_2$, $ZrO_2$, $ThO_2$, MgO, $Cr_2O_3$, $Zr_2O_3$, $V_2O_3$, a metal boride such as $TiB_2$, $ZrB_2$, $CrB_2$, $VB_2$, $SiB_6$, $ThB_2$, $HfB_2$, $WB_2$, $WB_4$ or a metal silicide such as $TiSi_2$, $ZrSi_2$, $MoSi_2$, MoSi, $WSi_2$, PtSi, $Mg_2Si$ or any other ceramic material. Preferably, the second material(s) comprise(s) CrN, $Cr_2O_3$ and/or CrAlN.

The layer of the second material and/or the two or more layers of different second materials preferably has/have a thickness no greater than 5 μm, preferably no greater than 2 μm, more preferably no greater than 1 μm, even more preferably no greater than 100 nm and most preferably no greater than 10 nm.

The plurality of recesses preferably have different depths, wherein each depth corresponds to a predefined value of information.

The minimum depth difference between the plurality of recesses is preferably at least 1 nm, preferably at least 10 nm, more preferably at least 30 nm, more preferably at least 50 nm, even more preferably at least 70 nm, and most preferably at least 100 nm and/or wherein the minimum depth difference between the plurality of recesses is at most 5 μm, preferably at most 1 μm, more preferably at most 500 nm, more preferably at most 300 nm, even more preferably at most 200 nm, and most preferably at most 100 nm.

BRIEF DESCRIPTION OF THE DRAWINGS

The subject matter of the invention will be explained in more detail in the following text with reference to preferred exemplary embodiments which are illustrated in the attached drawings, in which:

FIG. 3a depicts the 16 code elements of a regular 2×2 square-matrix code both schematically (top) and as a transmission micrograph at a magnification of 100× taken from a sample (bottom);

FIG. 3b depicts the 16 code elements of FIG. 3a and the additional 19 code elements possible with an inter-matrix code without overlap according to the present invention, both schematically (top) and as a transmission micrograph at a magnification of 100× taken from a sample (bottom);

FIG. 4 shows the principle of an inter-matrix code with overlap in case of a 4×4 square matrix code according to a preferred embodiment of the present invention, both schematically (top) and as a transmission micrograph at a magnification of 150× taken from a sample (bottom);

FIG. 5a shows techniques to define a reference depth for a matrix code without overlap, both schematically (top) and as a transmission micrograph at a magnification of 150× taken from a sample (bottom);

FIG. 5b shows techniques to define a reference depth for a matrix code with overlap, both schematically (top) and as a transmission micrograph at a magnification of 150× taken from a sample (bottom);

FIG. 6 depicts an example of various shapes and sizes of recesses according to a preferred embodiment of the present invention, both schematically (top) and as a transmission micrograph at a magnification of 50× taken from a sample (bottom);

FIG. 7 shows how various shapes of recesses may be achieved using multiple circular recesses according to a preferred embodiment of the present invention, both schematically (top) and as a transmission micrograph at a magnification of 100× taken from a sample (bottom);

FIG. 10a depicts 80 of the code elements possible with an inter-matrix code with overlap according to the present invention, both schematically (top) and as a transmission micrograph at a magnification of 100× taken from a sample (bottom); and FIG. 10b depicts all of the code elements possible with an inter-matrix code with overlap according to the present invention as a transmission micrograph at a magnification of 100× taken from a sample.

In principle, identical parts are provided with the same reference signs in the figures.

DETAILED DESCRIPTION

Figure 1:
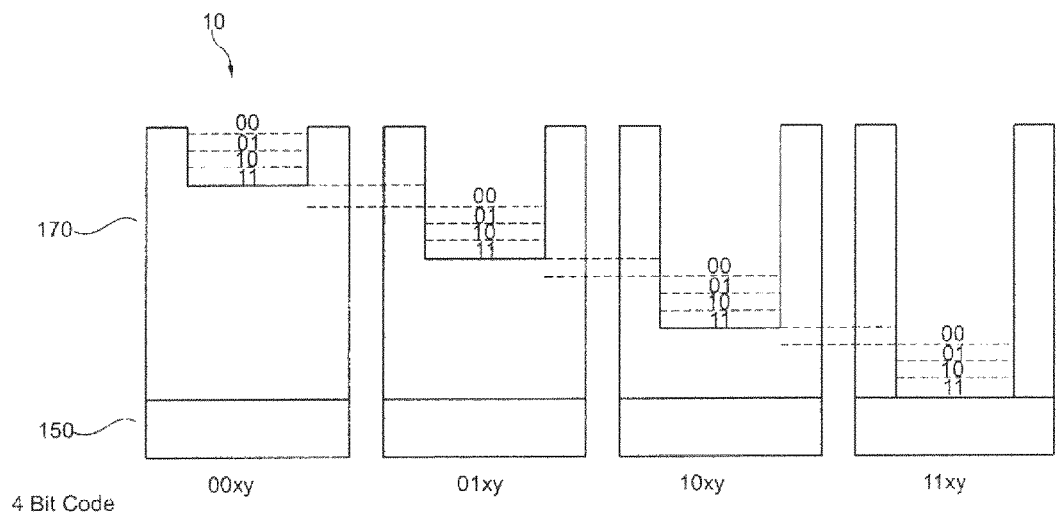
FIG. 1 schematically depicts a cross section through an information storage medium according to a preferred embodiment of the present invention.

FIG. 1 schematically depicts a cross section through an information storage medium according to a preferred embodiment of the present invention. The information storage medium comprises a, preferably ceramic, substrate 150 coated with a layer of a second material 170, the second material 170 being different from the material of the substrate 150. As mentioned above, a sintered interface (not shown) may be present between the substrate 150 and the layer of the second material 170 due to the optional tempering process, in particular in case the substrate 150 comprises a ceramic material. The layer of the second material 170 comprises a plurality of recesses 10 (four of which are shown exemplary) having different depths, wherein each depth corresponds to a predefined value of information. In the embodiment shown in FIG. 1, four bits of information can be encoded. For example, the smallest depth of a recess 10 (or, alternatively, a surface without any recess at all) may correspond to the value of information of code "0000". The largest depth of a recess 10 extending, for example, all the way through the second layer 170 to the substrate 150 may correspond to the value of information or code "1111". Analogously, each of the intermediate depths corresponds to a specific predefined value of information or code as well. While the depth difference between subsequent codes is shown in FIG. 1 to be constant, this does not necessarily to be the case.

Of course, the 4-bit code shown in FIG. 1 is only one specific example. Depending on the thickness of the second layer 170 and the depth differences of the various recesses 10 which can be both reliably manufactured for encoding and reliably measured for decoding more or less bits may be encoded.

Techniques for manufacturing such a substrate with a coating and for creating recesses of various depths within such a coating (or the substrate only) are described in great detail in the above-referenced '035 and '418 Publications, the entire contents of which are incorporated herein by reference, in particular with respect to said techniques.

The recesses 10 are merely shown schematically in FIG. 1. However, as elucidated in detail above, the plurality of recesses of the present application have different shapes and/or sizes in order to encode information, wherein each shape and/or size corresponds to a predefined value of information. FIG. 6 depicts an example of various shapes and sizes of recesses according to a preferred embodiment of the present invention, both schematically (top) and as generated in a sample (bottom). In particular, the first four sketches of the top row of FIG. 6 show three differently sized circular recesses (as well as no recess on the very left), which are clearly distinguishable from each other. In this example, three information values may be encoded by means of the size of the recess. Similarly, two bits (corresponding to four values of information) may be encoded by using different shapes of recesses as shown, e.g., in the last four sketches of the top row of FIG. 6 or the first four sketches in the bottom row of FIG. 6. These exemplary different shapes may also be realized by a single base shape (such as an ellipsoid or a triangle in the example of FIG. 6) being differently oriented. Of course, the various shapes shown in FIG. 6 may also be combined. For example, one may encode ten different values of information with one of the circular recesses and of the square recesses as shown in the top and bottom rows of FIG. 6, the four differently oriented triangles and the four differently oriented ellipses. In addition, or alternatively, differently sized recesses may be used to encode information.

As should be evident from the above summary of the first aspect of the present invention, the various recesses need not to have different depths as shown in FIG. 1, but may also only differ in shape and/or size as, for example, shown in FIG. 6. Moreover, the recesses may not be present in a layer of a second material 170 as shown in FIG. 1, but may also be present in a substrate material (without any coating).

If, however, recesses of different depths are employed, it is advantageous to provide a reference depth which allows, during decoding, to measure, e.g., the difference in height between the substrate or coating surface and, e.g., the bottom of each recess. For this purpose, the various recesses arranged, for example, in a square pattern may be provided within a reference frame 1 surrounding the entire pattern as schematically shown in FIG. 5*a*, where 16 circular recesses are schematically arranged in a square pattern. Alternatively, the reference frame may be present at only one, two or three sides of the pattern. Thus, an optical decoding system may measure, for example, the distance between a reference point of the optical decoding system and the reference frame on the one hand and the distance between said reference point and the bottom of each recess on the other hand. Thus, the distance between the bottom of each recess and the reference frame may be evaluated.

Alternatively, or in addition, other areas of the pattern where no recess is present, may be utilized in order to provide a reference. For example, the "void" 2 shown in FIG. 5*a* may be used to define a reference height.

Figure 2:
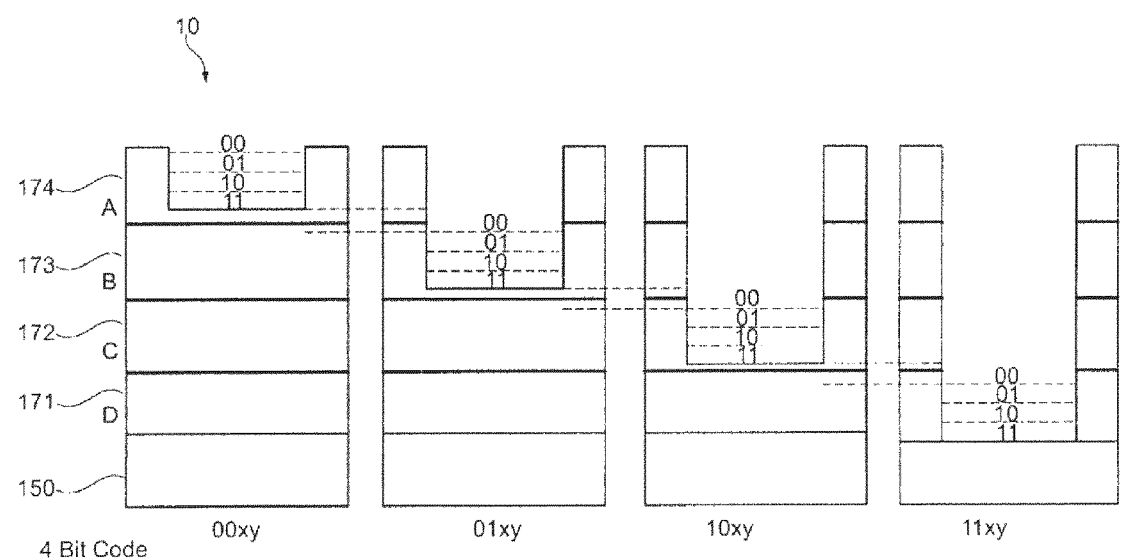
FIG. 2 schematically depicts a cross section through an information storage medium according to a preferred embodiment of the present invention.

FIG. 2 schematically depicts a cross section through an information storage medium according to a further preferred embodiment of the present invention. The information storage medium comprises a, preferably ceramic, substrate 150 coated with four layers 171 to 174 of different second materials being different from the material of the substrate 150. Again, a sintered interface (not shown) may be present at least between the substrate 150 and the bottommost layer 171 of the four layers. The sintered interface may comprise at least one element from both the substrate material and the material of the bottommost layer 171. Similar to the embodiment shown in FIG. 1, the information storage medium of the embodiment shown in FIG. 2 comprises a plurality of recesses 10 encoding information on the information storage medium, wherein the plurality of recesses 10 have different depths and wherein each depth corresponds to a predefined value of information. Again, 16 different depths are shown in FIG. 2 corresponding to a 4-bit code.

However, different from the embodiment shown in FIG. 1, in case of the embodiment shown in FIG. 2 four different bits are encoded (by means of different depths) in each of the four layers 171 to 174. If the four layers 171 to 174 are made from different materials, the optical response of each layer may be different. This allows for achieving high accuracy during decoding because the depth information achieved may be correlated with, for example, the optical response.

Of course, more or less than four layers of different second materials may be present depending on the number of bits to be encoded.

One particularly preferred example for the multi-layer coating shown in FIG. 2 is a two-layer coating with a metal layer 171 being coated on the substrate 150 and a metal oxide layer (of the same metal) 172 being coated on the metal layer 171. If such a two-layer coating is illuminated with incident white light, a part of the incident light is reflected at the oxide layer, whereas another part of the incident light is refracted into the oxide layer and reflected at the oxide/metal interface, as explained in the above-referenced '418 Publication. The light beam having been reflected at the oxide layer and the light beam having being reflected at the metal layer can be in phase, which leads to a visible colour, or out of phase, which does not yield said colour to be visible. Accordingly, a certain colour (which depends on the indices of refraction of both the oxide layer and the metal layer and the thickness of the oxide layer) is visible wherever the oxide layer is present, yet is invisible if the depth of a certain recess leads to destructive interference at this particular spot, as explained in the above-referenced '418 Publication.

As elucidated in detail in the above description of the first aspect of the present invention, the concept of these various recesses extending into different layers of the two or more layers can be advantageously combined with the idea of the present invention to provide a plurality of recesses having different shapes and/or sizes as exemplary shown in FIG. 6.

FIG. 3 schematically shows the concept of the inter-matrix positions of recesses according to the second aspect of the present invention. FIG. 3*a* schematically depicts the 16 code elements of a regular 2×2 square matrix code with the circles representing positions of recesses on said square matrix. These 16 permutations allow for encoding four bits of information. FIG. 3*b* schematically depicts the 16 code elements of FIG. 3*a* (upper portion) and the additional 19 code elements (lower portion) possible with an inter-matrix code without overlap according to the present invention.

The bottom portion of FIG. 3*b* shows the same 2×2 square matrix as FIG. 3*a*. However, now inter-matrix positions are occupied by recesses, which inter-matrix positions correspond to positions being arranged exactly and symmetrically in between two positions of the regular square matrix according to FIG. 3*a*. This allows for encoding 19 further code elements leading to a total of 35 code elements, which corresponds to 5.13 bits. In other words, utilizing the inter-matrix positions substantially enhances the storage capacity of said 2×2 square matrix.

The scheme shown in FIG. 3 is based on the requirement that no adjacent recesses overlap each other in order to allow for an accurate readout without fault. However, if such overlap is accepted (e.g. due to an improved resolution during decoding), the storage capacity may be further increased. This is illustrated in FIG. 4, which, on the far left, schematically depicts the 16 bits of a regular 4×4 square matrix code with the 16 circles representing the 16 possible positions of recesses on said square matrix without overlap. Now, if one accepts two adjacent circular recesses to overlap by one radius of a recess, one may shift each position of each recess by one radius to the right. This yields 12 additional positions for recesses (within the original square) as indicated in the second sketch of FIG. 4. These 12 additional positions correspond to 12 further bits of information. Similarly, one may shift each position of each recess by one radius to the bottom as indicated in the third sketch of FIG. 4 or to the right and the bottom as indicated on the far right in FIG. 4. Thus, an additional 12 bits and 9 bits may be gained. In total, the 4×4 inter-matrix code with overlap allows for encoding a total of 49 bits as compared to the 16 bits of the regular 4×4 square matrix code.

As indicated in FIG. 4, this scheme may be generalized to any rectangular M×N matrix. Due to the three possibilities to shift said pattern discussed above, such a matrix allows for encoding M×N bits+$N_x$(M−1) bits+M×(N−1) bits+(N−1)×(M−1) bits=[4MN−2(N+M)+1] bits as compared to the MN bits of the regular M×N rectangular matrix code.

As an intermediate alternative between the two above-discusses extremes one may also choose to only one particular form of overlap. For example, one may combine the positions shown in the far left of FIG. 4 with those shown in the far right of FIG. 4 only. In terms of decoding this only requires that the pattern shown in the far left of FIG. 4 may be reproducibly generated in such a manner as to ensure that each void in between each square pattern of four recesses, where no material has been removed (i.e., a "void" corresponds to a protrusion of material on the surface of the information storage medium), is maintained. If one can precisely control the size and position of each recess such that it is guaranteed that a void is always present in between a square arrangement of four recesses, a further code element can be created by placing a further recess on said very void. These are the positions shown in the far right of FIG. 4. If such overlap is allowed, an M×N matrix provides an additional (M−1)×(N−1) positions for further recesses, leading to a total of 2MN−M−N+1 bits (or $N^2+(N-1)^2$ bits in case of the N×N square matrix).

An example of such an inter-matrix code with overlap is shown schematically in FIG. 5b for a 4×4 square matrix of recesses with 7 of the 9 voids being occupied by additional recesses. As discussed above with respect to FIG. 5a, the reference frame 1 or one of the voids 2, which is not occupied, may be used as a reference height for measuring the depth of each recess.

As discussed above with respect to FIG. 6, the plurality of recesses of the present application may have different shapes in order to encode information, wherein each shape corresponds to a predefined value of information. The bottom part of FIG. 6 shows an experimental realization of the various shapes depicted schematically in the top part of FIG. 6. For the example, a ceramic substrate having a size of 10×10 mm and consisting of 100 μm thick sapphire substrate ($Al_2O_3$) was coated with a coating of CrN having a thickness of 100 nm by means of physical vapor deposition (PVD). Circular recesses having a diameter of about 1 μm (i.e. dimensions much smaller than the shapes to be achieved) were ablated from the coating using a 200 femtosecond laser at a wavelength of 515 nm in order to generate certain geometric shapes without any coating.

The resulting information storage medium was imaged with an Olympus BX-51 at a magnification of 50×. As can be seen by comparing the top and bottom parts of FIG. 6 the various shapes can be reproducibly generated with great accuracy and the difference in shape is easily discernably by naked eye. Rather than piecing the shown shapes together by multiple circular recesses one may also achieve such shapes by using laser beam shaping, e.g., with the help of a spatial light modulator (SLM).

FIG. 7 more clearly shows the technique discussed in the context of FIG. 6 for achieving various shapes of recesses using multiple circular recesses according to a preferred embodiment of the present invention, both schematically (top) and as generated in a sample (bottom). For example, the arrangements of two overlapping circular recesses in four different patterns shown in the first four sketches of the top row of FIG. 7 may yield the four ellipsoids being differently oriented as shown in the bottom row of FIG. 6. Similarly, three overlapping circular recesses in the far right of the bottom row of FIG. 7 may yield the triangular shape shown in the far right of the top row of FIG. 6. As indicated in the remaining arrangements in the bottom row of FIG. 7, said triangular shape may also be oriented differently. The bottom part of FIG. 7 shows an experimental realization of the various shapes depicted schematically in the top part of FIG. 7. For the example, a ceramic substrate having a size of 10×10 mm and consisting of 100 μm thick sapphire substrate ($Al_2O_3$) was coated with a coating of CrN having a thickness of 100 nm by means of PVD. Circular recesses having a diameter of about 1 μm were ablated from the coating using a 200 femtosecond laser at a wavelength of 515 nm.

The resulting information storage medium was imaged with an Olympus BX-51 at a magnification of 100×. Each individual dot is 1 μm in diameter. As can be seen by comparing the top and bottom parts of FIG. 7 the various shapes can be reproducibly generated with great accuracy and the difference in shape is easily discernably by naked eye. While one may, in case of this particular example, even distinguish the various circular recesses forming each shape, this is apparently not necessary as long as the resulting shapes of the interconnecting recesses are still distinguishable from each other by a suitable imaging and/or detection technique.

Figure 8:
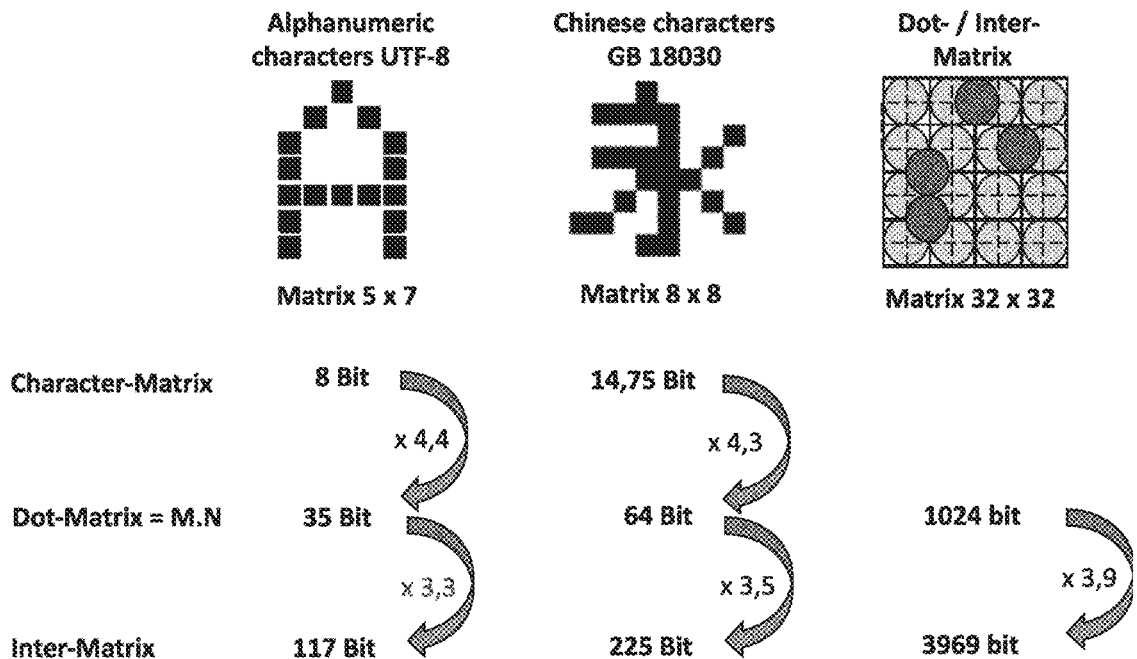
FIG. 8 schematically shows alphanumeric and Chinese character sets based on square segments in comparison with a dot-matrix and inter-matrix code related to information capacity in bits.

In FIG. 8, alphanumeric and Chinese character sets based on square segments are compared with a dot-matrix and inter-matrix code related to information capacity in bits.

With a 5×7 square matrix an alphanumeric character set (UTF-8) with 256 different characters (8 bits) can be displayed and deciphered by the human eye. With an 8×8 square matrix approximately 27,550 Chinese characters (14.75 bits) can be displayed and deciphered by experienced Chinese readers. By contrast, a 5×7 or 8×8 square matrix with circular recesses can achieve about 4.4 or 4.3 times more combinations that could be displayed and recognized by a digital reading system. Even further increase of storage capacity can be achieved by using inter-matrix positions in accordance with the present invention, which enable up to M×N+M×(N−1)+$N_x$(M−1)+(M−1)×(N−1) different patterns as exemplified in FIG. 4. According to this formula the information capacity of a 5×7 matrix can be increased from 35 bits to 117 bits or by a further factor 3.3. This ratio increases to a factor 3.5 for the larger 8×8 matrix enabling 225 bits for inter-matrix coding. For larger matrices, this ratio approximates 4 as can be observed by the example of a 32×32 matrix, which enables 1,024 bits as a regular dot matrix and 3,969 bits in the inter-matrix regime. While it might be difficult to employ each of these patterns for reliable discrimination since the overlapping matrixes require a very high special resolution of the optical system and the detector, even a more practical approach of using, e.g., only about 3,000 bits would provide a tremendous advantage over prior art techniques.

Figure 9:
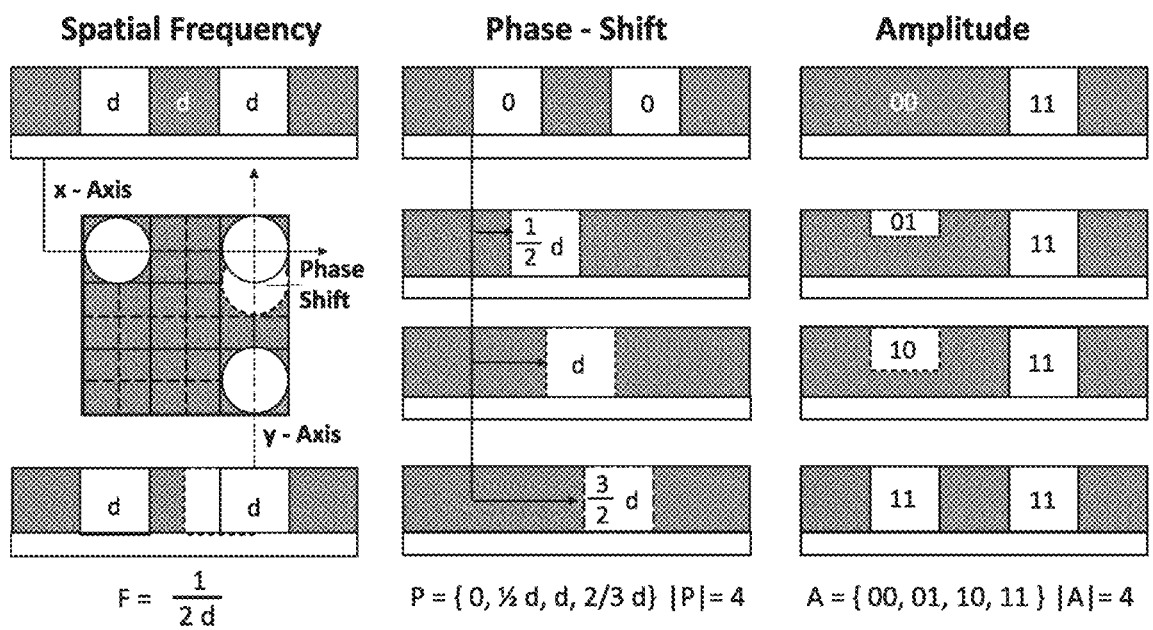
FIG. 9 illustrates an estimation of the potential maximum storage capacity considering spatial frequency, phase shift and amplitude of recesses.

A more general way of estimating the potential maximum storage capacity per mm² can be derived from FIG. 9, assuming a 2-dimentional surface determined by x- and y-axes in which the special frequency (lines per mm), the number of phase-shift positions along these axes and one half of the number of depth-levels of the recesses determine the capacity per mm². The factor ½ is required to convert the number of depth levels into bits, since one bit equals actually two different depth levels.

$$\text{Data Storage Density} \leq (F_x \cdot |P_x|) \cdot (F_y \cdot |P_y|) \cdot (\tfrac{1}{2}|A|) \cdot \text{Bits/mm}^2$$

FIG. 10*a* depicts 80 of the code elements of a regular 2×2 square matrix possible with an inter-matrix code with overlap according to the present invention, both schematically (top) and as generated in a sample (bottom). As is evident from said figure, the use of overlap dramatically increases the number of potential code elements as compared to the 35 possible code elements without overlap (see FIG. 3*b*). Of course, this tremendous number of code elements may only be utilized if these code elements can on the one hand be precisely and reproducibly generated and on the other hand correctly read out by a corresponding reading system with a sufficiently small error rate.

In order to prove that this is, in fact, possible, an experiment has been performed generating each and every possible code element for a regular 2×2 square matrix possible with an inter-matrix code with overlap. For the example, a ceramic substrate having a size of 10×10 mm and consisting of 100 μm thick sapphire substrate ($Al_2O_3$) was coated with a coating of CrN having a thickness of 100 nm by means of PVD. Circular recesses having a diameter of about 1 μm were ablated from the coating using a 200 femtosecond laser at a wavelength of 515 nm.

The resulting information storage medium was imaged with an Olympus BX-51 at a magnification of 100×. Each individual dot is 1 μm in diameter. The result of said experiment is shown in FIG. 10*b*. As can be seen (also by comparing the top and bottom parts of FIG. 10*a*) the various code elements can be reproducibly generated with great accuracy and the difference in shape is easily discernably even by naked eye.

What is claimed is:

1. A method for storage of information comprising the steps of:
   providing a substrate of a first material, wherein the substrate comprises a plurality of first predetermined positions in a first two-dimensional regular pattern and a plurality of second predetermined positions in a second two-dimensional regular pattern; and
   creating a plurality of recesses in a surface of the substrate by using a laser and/or a focused particle beam in order to encode information in the substrate;
   wherein the plurality of recesses occupy a first subset of the first predetermined positions and/or a second subset of the second predetermined positions,
   wherein the first predetermined positions have a center-to-center distance between directly adjacent positions corresponding to at least 75% and to at most 150% of a maximum cross-sectional dimension of the recesses,
   wherein the second predetermined positions have a center-to-center distance between directly adjacent positions corresponding to at least 75% and to at most 150% of the maximum cross-sectional dimension of the recesses, and
   wherein a center-to-center distance between any pair of one of the first predetermined positions and a directly adjacent second predetermined position is smaller than 75% of the maximum cross-sectional dimension of the recesses.

2. The method of claim 1, wherein for each pair of directly adjacent first and second predetermined positions only one of the first and second predetermined positions is occupied by a recess.

3. The method of claim 1, wherein the first two-dimensional regular pattern of the first predetermined positions defines a first pattern of voids if each of the first predetermined positions is occupied by one of the recesses, and wherein each of the second predetermined positions, if occupied by a recess, completely covers a void.

4. The method of claim 3, wherein each center of each of the second predetermined positions corresponds to a center of one of the voids.

5. The method of claim 1, wherein the center-to-center distances between the directly adjacent positions in the regular patterns of the first and second predetermined positions corresponds to at least 95% of the maximum cross-sectional dimension of the recesses.

6. The method of claim 1, wherein the center-to-center distances between the directly adjacent positions in the regular patterns of the first and second predetermined positions corresponds to at most 130% of the maximum cross-sectional dimension of the recesses.

7. The method of claim 1, wherein the center-to-center distance between any pair of one of the first predetermined positions and the directly adjacent second predetermined position is smaller than 60% of the maximum cross-sectional dimension of the recesses.

8. The method of claim 1, wherein the first material is a ceramic.

9. An information storage medium, comprising:
   a substrate of a first material, wherein the substrate comprises a plurality of first predetermined positions in a first two-dimensional regular pattern and a plurality of second predetermined positions in a second two-dimensional regular pattern; and
   wherein a surface of the substrate comprises a plurality of recesses encoding information,
   wherein the plurality of recesses occupy a first subset of the first predetermined positions and/or a second subset of the second predetermined positions,
   wherein the first predetermined positions have a center-to-center distance between directly adjacent positions corresponding to at least 75% and to at most 150% of a maximum cross-sectional dimension of the recesses,
   wherein the second predetermined positions have a center-to-center distance between directly adjacent positions corresponding to at least 75% and to at most 150% of the maximum cross-sectional dimension of the recesses, and
   wherein a center-to-center distance between any pair of one of the first predetermined positions and a directly adjacent second predetermined position is smaller than 75% of the maximum cross-sectional dimension of the recesses.

10. The information storage medium of claim 9, wherein for each pair of directly adjacent first and second predetermined positions only one of the first or second predetermined positions is occupied by a recess.

11. The information storage medium of claim 9, wherein the center-to-center distances between the directly adjacent positions in the regular patterns of the first and second predetermined positions corresponds to at least 85% of the maximum cross-sectional dimension of the recesses.

12. The information storage medium of claim 9, wherein the center-to-center distances between the directly adjacent positions in the regular patterns of the first and second predetermined positions corresponds to at most 140% of the maximum cross-sectional dimension of the recesses.

13. The information storage medium of claim 9, wherein the center-to-center distance between any pair of one of the first predetermined positions and the directly adjacent second predetermined position is smaller than 70% of the maximum cross-sectional dimension of the recesses.

14. The information storage medium of claim 9, wherein the first material is a ceramic.

15. The information storage medium of claim 9, wherein the substrate comprises the plurality of the first predetermined positions and the plurality of the second predetermined positions, and wherein the plurality of recesses occupy the first subset of the first predetermined positions and the second subset of the second predetermined positions.

* * * * *